United States Patent [19]
Koyanagi et al.

[11] Patent Number: 5,742,843
[45] Date of Patent: Apr. 21, 1998

[54] CONTROL SYSTEM FOR ACCESS BETWEEN PROCESSING ELEMENTS IN A PARALLEL COMPUTER

[75] Inventors: Yoichi Koyanagi; Osamu Shiraki; Takeshi Horie; Toshiyuki Shimizu; Hiroaki Ishihata, all of Kawasaki, Japan

[73] Assignee: Fujitsu Limited, Kawasaki, Japan

[21] Appl. No.: 503,916

[22] Filed: Jul. 19, 1995

[30] Foreign Application Priority Data

Jul. 20, 1994 [JP] Japan ................... 6-167903
Jul. 20, 1994 [JP] Japan ................... 6-167904
Jul. 20, 1994 [JP] Japan ................... 6-168483

[51] Int. Cl.⁶ ........................... G06F 15/80
[52] U.S. Cl. ................. 395/800.14; 711/118
[58] Field of Search ............ 395/800, 800.14, 395/800.06; 711/118, 120

[56] References Cited

U.S. PATENT DOCUMENTS 5,165,023  11/1992  Gifford ................... 395/325
5,347,639  9/1994  Rechtschaffen ........... 395/375
5,537,569  7/1996  Masubuchi ............... 395/448
5,613,136  3/1997  Casavant ................ 395/800

*Primary Examiner*—Eric Coleman
*Attorney, Agent, or Firm*—Staas & Halsey

[57] ABSTRACT

When the processor writes a command data string into an address of the command entry area, a corresponding command is created by a bus interface. If an address output by the processor corresponds to a distributed shared memory area, the bus interface creates a remote access command. The send controller constructs a message based on the command created by the bus interface. This message is sent either to an interconnection network, or to a receive controller. The receive controller receives the message and interprets it. An address output by the processor is detected by a cache area access unit, and the cache area in the memory is accessed. When the processor receives an interrupt request while waiting for a response message to a remote read request, an deadlock control unit detects an abnormal end of the remote read request that the remote read has ended in an error, and, controls the processor to process the interrupt request with priority.

39 Claims, 25 Drawing Sheets

FIG. 19

| COMMAND NAME | SIGNAL | COMMAND TYPE | | M (MESSAGE TYPE) |
|---|---|---|---|---|
| | | AS (DEST) | AS (SRC) | |
| REMOTE READ | RD | QUEUE/SUPER SPARC | COMM. REG. | GET |
| REMOTE WRITE | WR | COMM. REG. | QUEUE/SUPER SPARC | REMOTE WRITE |
| REMOTE SWAP | LDST | COMM. REG. | QUEUE/SUPER SPARC | SWAP |

CONTROL SYSTEM FOR ACCESS BETWEEN PROCESSING ELEMENTS IN A PARALLEL COMPUTER

BACKGROUND OF THE INVENTION

1. Field of the Invention

This invention relates to a parallel computer in which a plurality of Processing Elements (PEs) are linked in an Interconnection Network (IN); in particular, it relates to a control system for access between the plurality of Processing Elements.

2. Description of the Related Arts

The increasing speed of large general purpose computers based on the principle of sequential processing is approaching the limits of the hardware technology and of the logical methods used, increasing the need for parallel computers in which processing is done by a plurality of processing elements in parallel.

In particular, for simulation in science and technology calculation fields (fluid dynamics, atomic physics, molecular science etc.) an enormous amount of calculation is needed in order to maintain the reliability and accuracy of the solutions. The enormous amount of computation time needed for these huge calculations has become a problem, increasing the need for parallel computers in order to shorten the calculation time.

FIG. 1 is a block diagram showing the overall configuration of a parallel computer with a general distributed shared memory configuration.

A Processing Element PE10 has a communication control unit 13 that controls communications between the processor 11 and the accessed memory 12, and between the processor 11 and other PE10s via the Interconnection Network 14.

In a parallel computer, since the plurality of processors 11 in each PE10 proceed to do the processing while cooperating to distribute the load and the functions, communication between the processors 11 is indispensable.

By performing this kind of communication, it becomes possible for the PE10s to share the memories 12 which are distributed among the PE10s, so that in effect the system as a whole has a single, very large memory. This type of memory configuration is called a distributed shared memory mechanism.

In general, the "message passing method" is used as the method of access to the remote PE10s via the interconnection network.

In order to improve the performance of a parallel computer, it is important for the communication among these processors 11 to be performed at high speed, so that these processors 11 can access the memory resources efficiently.

The distributed shared memory mechanism in a parallel computer provides advantages such as that, in software development for a parallel computer, which is generally difficult, the transition from traditional programming is made easier, and it is easy to develop a parallel compiler.

However, in this kind of parallel computer, problems occur in access to the memory resources related to communications among the PE10s. These problems are discussed below.

In general, communication by the message passing method among the processors 11 is carried out by sending and receiving commands which have a plurality of parameters, and data which are ancillary to the commands.

Until now, methods such as the following have been used for this kind of message communication.

a. A plurality of registers (not shown here), in which commands, each of which consists of a statement of the type of command and in which the parameters of each command are set, are formed in the communication control unit 13. After a processor 11 sets the type of command and the parameters to be sent to the processor 11 in another PE10 (a remote PE10), a sending unit (not shown), which is formed inside the communication control unit 13, starts operation. When this happens, the sending unit successively interprets the commands and their parameters set in the plurality of registers and constructs a sending message, and sends this message to the remote PE10 through the interconnection network 14.

b. The processor writes each command into the specified area in the memory 12. Next, the processor 11 posts the address on the memory 12 at which the command is written to the communication control unit 13, and the communication control unit 13 starts operation. The communication control unit constructs a send message in a manner similar to that in method a. described above, and sends this message to the remote PE10 through the interconnection network 14.

However, in the method a. above, the register contents set in the communication control unit 13 must be protected until the contents are sent to another PE10 through the interconnection network 14 by the sending unit. Consequently, during this time, in order to prohibit access to the said register at the user level, it is necessary for the operation of setting the command in the register to be done by transfer to the system level by issuing a system call. When a system call is issued for this transfer from the user level to the system level, the system moves on to execution of the operating system kernel, and this kernel executes many processor commands for the level transfer processing. The processing time of the processor 11 needed to execute these commands becomes protracted, causing the system throughput to drop.

In addition, in method a., the commands consisting of 1 to several words must be set in the register in the communication control unit 13 for each communication, so when several messages are sent in succession, it is necessary to wait for completion of the communication processing for the immediately preceding message before the communication control unit 13 starts operation. That is to say, the communication processing can be done for only one message at a time. In addition, it is usual to add another unit inside the communication control unit 13 which interrupts the processor 11 every time a message communication is completed, in order to reduce the waiting time that is generated every time a message communication is carried out. However, the interrupt processing that is executed by the processor 11 in conjunction with this interrupt requires the execution of many processor commands, just as does the above-mentioned level transfer processing, causing the problem that this processing time also becomes protracted.

Meanwhile, in method b., by using a continuous area on the memory 12, it becomes possible to set a plurality of commands in the set continuous area, making it possible to process a succession of message communications efficiently and at high speed. However, it is necessary to protect the plurality of commands that are set in the area on the memory 12 from other processes, until the transfer of this message is completed. This protection is impossible at the user level. It becomes necessary to transfer to the system level by a method similar to that described for method a described above; it is necessary to protect the memory area using, for example, an MMU (memory management unit). Consequently, the same problem arises in this method as in the above method a. In addition, a whole series of processes are necessary: calculation of the value(s) of 1 or a plurality of parameters for each of a plurality of commands; storage of the commands in the memory 12 after the calculations; setting of the storage addresses of the commands in the communication control unit 13, followed by starting operation of the communication control unit 13. This raises the problem that the larger the number of commands to be stored in the memory 12, the longer the processing time for the series of processes described above.

With either method, to prevent an invalid command from being written in, it is necessary for the software to check whether or not the data values that are written in via system calls are correct. This operation increases the time that it takes to issue a command, causing the overall system performance to drop. To reduce the time taken, it is necessary for the commands to be written in at the user level, without going through system calls. However, when a command is written in at the user level, the operating system cannot check whether or not its values are valid. Consequently, there is the problem that extra hardware is needed for the check mechanism to check the appropriateness of these data, in other words, to protect the operation.

In addition, as stated above, a distributed shared memory mechanism in a parallel computer offers such advantages as making the transition from previous programs easy, and making it easy to produce a parallel compiler. However, among the commands which are issued by the processor 11, in the REMOTE READ command, which is one of the remote access commands by which PE10 accesses the memory 12, when the processor issues this command, the bus inside the same PE10 is monopolized and on standby status until a response to the command is received. Access to the shared memory 12 through the interconnection network 14, as in the execution of a REMOTE READ command, is slower than the normal processor operation, making it difficult to operate the PE10s throughout the whole system efficiently.

In response to this problem, there are several methods to operate the processors efficiently by placing a high speed, small capacity cache memory (not shown in FIG. 1) in each PE10. The number of times that the distributed memory 12 is accessed can be reduced by storing the contents of the memory 12 in a remote PE10 that has been accessed once in the cache memory. However, this type of method requires a very complicated mechanism called cache coherency to preserve the consistency of the contents of the exclusive-use cache memory and the cache memory as seen from the processor. In addition, because of the complexity of the operation, with its emphasis on universal applicability, depending on the nature of an application, that is to say the memory read/write pattern, there will be some cases in which optimum performance is not obtained from the system.

In the case of REMOTE READ, when a cache hit is scored (the desired data are in the cache memory) then it is sufficient to read those data out of the external cache memory, but in the cache of a cash miss (the desired data are not there) an access exception is generated and it is necessary to repeat execution of access to an external cache memory, after the address and its content are transferred from the corresponding remote PE10 to the external cache memory of the requesting PE10, and temporarily written in to the external cache memory; so the data in question must be transferred from the remote PE10 to the external cache memory of the requesting PE10. However, until now the cache memories have had small capacity, so in the case of a READ command (reading data in from an external cache memory) there has been a high rate of misses, making it difficult and complicated to transfer the data from the remote PE10. For this reason, there has been the problem that in a parallel computer with a previous type of distributed shared memory mechanism, a REMOTE READ takes a great deal of time. In addition, there is the problem of cost if an attempt is made to increase the memory size of the external cache memory in order to reduce the rate of misses.

Further, in the case of a REMOTE READ command by which the processor 11 of the requesting PE10 reads out the contents of the memory 12 of a remote PE10 by means of a READ command, during the time until the result of that readout is posted to the processor, the processor monopolizes the bus in its own PE, and other processing cannot be performed. If a REMOTE READ command is sent from another PE, it is often necessary to make an interrupt request to the processor that is in this status, so that the response message can be sent.

In order for a REMOTE READ command to be executed normally, the destination PE10 of the REMOTE READ command must return a response message to the requesting PE10 no matter what status it is in.

However, it is very difficult to form a configuration such that the PE10 will be able to return a response message regardless of the status that it is in. For example, in order for the communication control unit of the destination PE10 to send a response message in response to a command from a requesting PE10, it is necessary for the processor 11 of the destination PE10 to perform interrupt processing. If a situation arises in which a REMOTE READ command circulates among a plurality of processors 11 and, in addition, a processor cannot perform interrupt processing because it is waiting for a response to the REMOTE READ command, the system becomes deadlocked.

FIG. 2 is a diagram that explains this deadlock status.

The processor 11-0 of PE10-0 sends a REMOTE READ command from the message send unit 21-0 to the remote PE10-1. In the remote PE10-1, the REMOTE READ command from PE10-0 is received by the message receive unit 22-1. In order to respond to the request of the REMOTE READ command, in PE10-1 a request for an interrupt to the processor 11-1 is sent from the interrupt request unit 20-1. However, if, as the time when PE10-0 will send the REMOTE READ command is approached, PE10-1 also sends a REMOTE READ command via the message send unit 21-1, then the PE10-1 interrupt request cannot be executed until the response to the REMOTE READ command from PE10-0 comes back. In PE10-0, before the REMOTE READ command from PE10-1 is received, a REMOTE READ command to the processor 11-1 is issued via the message send unit 21-0; PE10-0 is unable to receive the interrupt request generated upon the receipt of the REMOTE READ command from PE10-1 by the message receive unit 22-0. That is to say, since PE10-0 has already issued a REMOTE READ command to PE10-1, the interrupt request from the interrupt request unit 20-0 cannot be received until the response to the REMOTE READ command comes. Consequently, although the PE10-0 interrupt request is not received until the response to the PE10-0 REMOTE READ command comes, the PE10-1 interrupt request, conversely, also cannot be received until the response to the PE10-1 REMOTE READ command comes.

Consequently, both PE10-0 and PE10-1 are waiting for responses from the other to their respective REMOTE READ commands, and a deadlock occurs.

That is to say, a deadlock occurs when a REMOTE READ command is sent from PE10-0 to PE10-1, the REMOTE READ command arrives at PE10-1 and an interrupt request is issued to the processor 11-1, and in addition a REMOTE READ command is sent from PE10-1 to PE10-0, and the latter REMOTE READ command arrives at PE10-0, and an interrupt request is sent to the processor 11-0 nearly in parallel with the interrupt request to the processor 11-1.

One method that has been used in the past to solve this problem is to set a time limit. The waiting time for arrival of a REMOTE READ result is limited using a timer; if the result has not yet arrived after that time has expired, then an error occurs.

However, this method has the problems listed below, which make it difficult to set an appropriate limiting time.
1. During the time until the time limit is reached, the processor stops completely; even processing of an interrupt that requires a fast response cannot be started.
2. If the time limit is too short, response messages to REMOTE READ commands will consistently fail to arrive in time, so that in effect the REMOTE READ command cannot be executed. Conversely, if the time limit is too long, if for some reason it should take a long time for the response to arrive from the destination PE, the processor will be unable to do anything for that time, seriously affecting the whole system.

SUMMARY OF THE INVENTION

The purpose of this invention is to solve the problems described above, and thus to provide an access control system for access between processors for the purpose of constructing a parallel computer system that has good system efficiency and in which the processors will operate efficiently.

The access control system for access between processor elements of this invention assumes that there is a parallel computer system in which a plurality of processor elements are linked through an interconnection network.

In the communication control system for communication between processor elements of this invention, each processor element has:

A memory that has a command entry area consisting of a 1st storage area and a cache area that consists of a 2nd storage area that is different from the said command entry area, and A processor that outputs at least the access destination address, and, if the address that is output is in a command entry area, writes a command data string into the command entry area, and A bus interface that monitors the processor output addresses, and (1) if the processor output address is in a command entry area, creates a command from the command data string; (2) if the address is in a specified area other than a command entry area or a cache area, creates a command for the purpose of remote access based on the processor output data; (3) in the case of remote access, accesses the cache area in accordance with the address content, and, when the processor is on standby waiting for a response message to a remote access, controls the processor so that the processor is able to perform the interrupt request on a priority basis; and A send controller that interprets commands created by the bus interface and constructs messages to be sent, and An interconnection network interface that sends messages for sending created by the send controller to the interconnection network and receives messages from the interconnection network, and A receive controller that interprets messages received by the interconnection network interface, and stores the data transferred by the messages in a specified area of the memory through the bus interface.

In this kind of inter-processor access control system of this invention, first the processor can issue a command by writing parameters etc. into the preassigned address in the command entry area in its own address space. Consequently, by assigning an address area for issuing user-level commands in the command entry area, it becomes possible for the processor to issue commands at the user level, making it unnecessary to transfer to the system level when a command is issued and thus reducing operating time.

In addition, the bus interface is constantly checking whether or not an interrupt to the processor has been issued when a REMOTE READ request, which is one kind of remote access, is issued from the processor. If a response message arrives from the destination processor element without an interrupt request being issued, the REMOTE READ request terminates normally. If an interrupt request is issued before a response message arrives from the destination PE, the processor is informed that an error has occurred with respect to the REMOTE READ request, and immediately the interrupt processing is started and the interrupt request is responded to quickly. This makes it possible to avoid the occurrence of a deadlock.

Further, since the external cache memory is eliminated and part of the internal memory area is used as the cache memory, the cache area capacity can be made several orders of magnitude larger than that of an external cache memory. This makes it possible to reduce the frequency of misses and reduce the frequency of reads from the remote PE, increasing the operation speed of the parallel computer. In addition, since an external cache memory is not used, an external cache memory control unit is unnecessary, making it possible to simplify the configuration.

BRIEF DESCRIPTION OF THE DRAWINGS

FIG. 19 shows the content of the command type information specified by the 1st word of a message which issues a REMOTE READ command, a REMOTE WRITE command or a REMOTE SWAP command.

DESCRIPTION OF THE PREFERRED EMBODIMENTS

Figure 1:
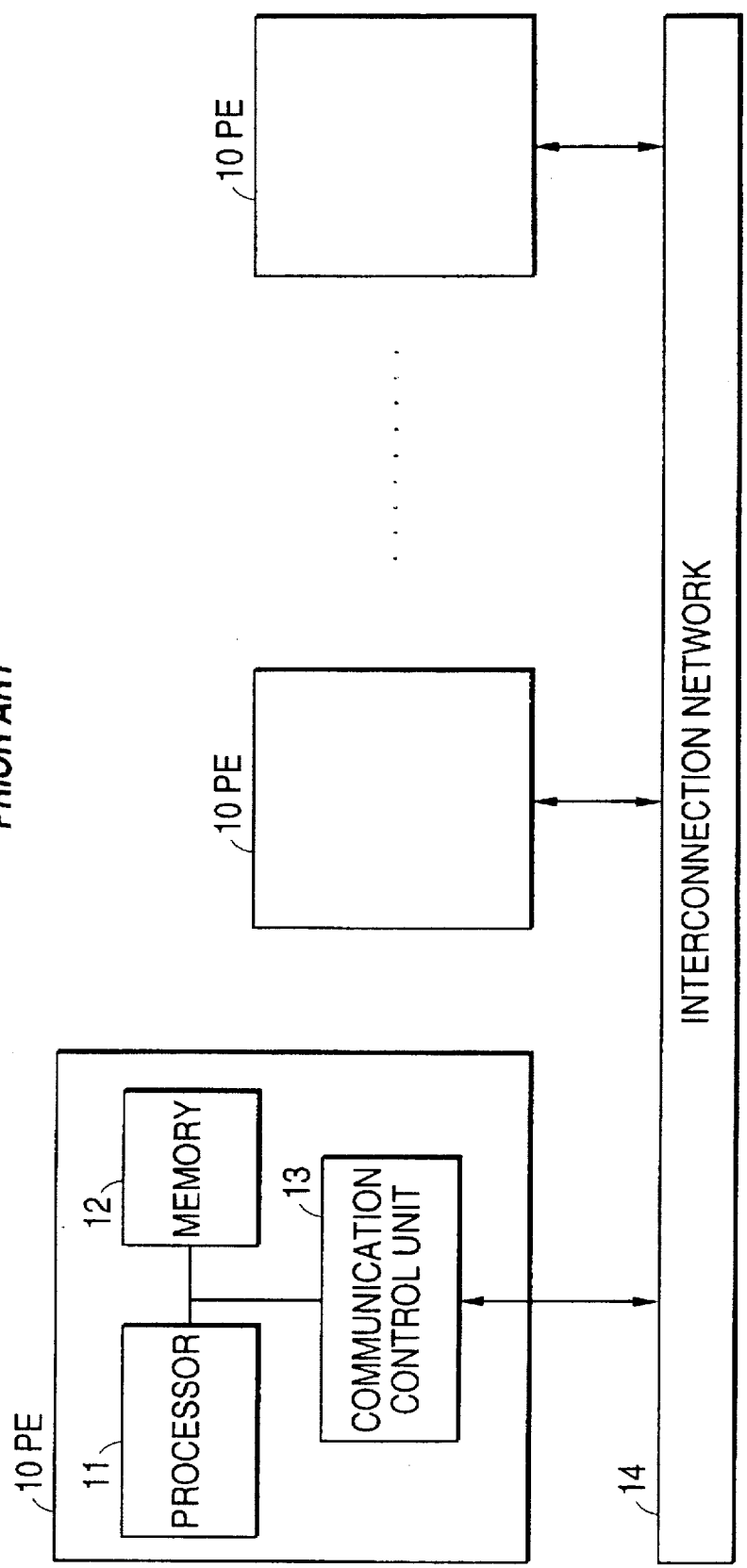
FIG. 1 is a diagram explaining the overall configuration of a parallel computer.
Figure 2:
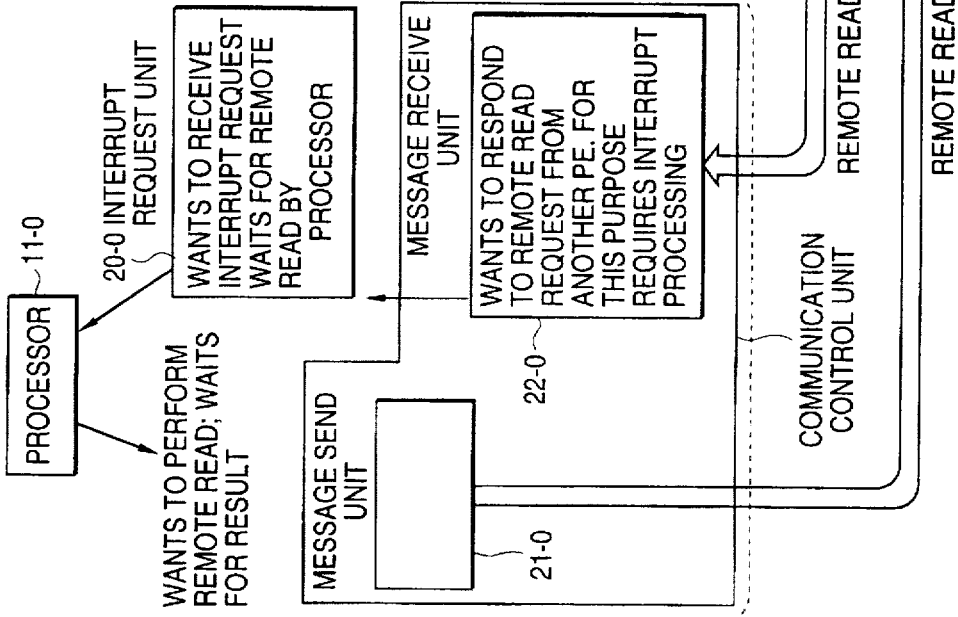
FIG. 2 is a diagram explaining the occurrence of deadlock in a parallel computer.
Figure 3:
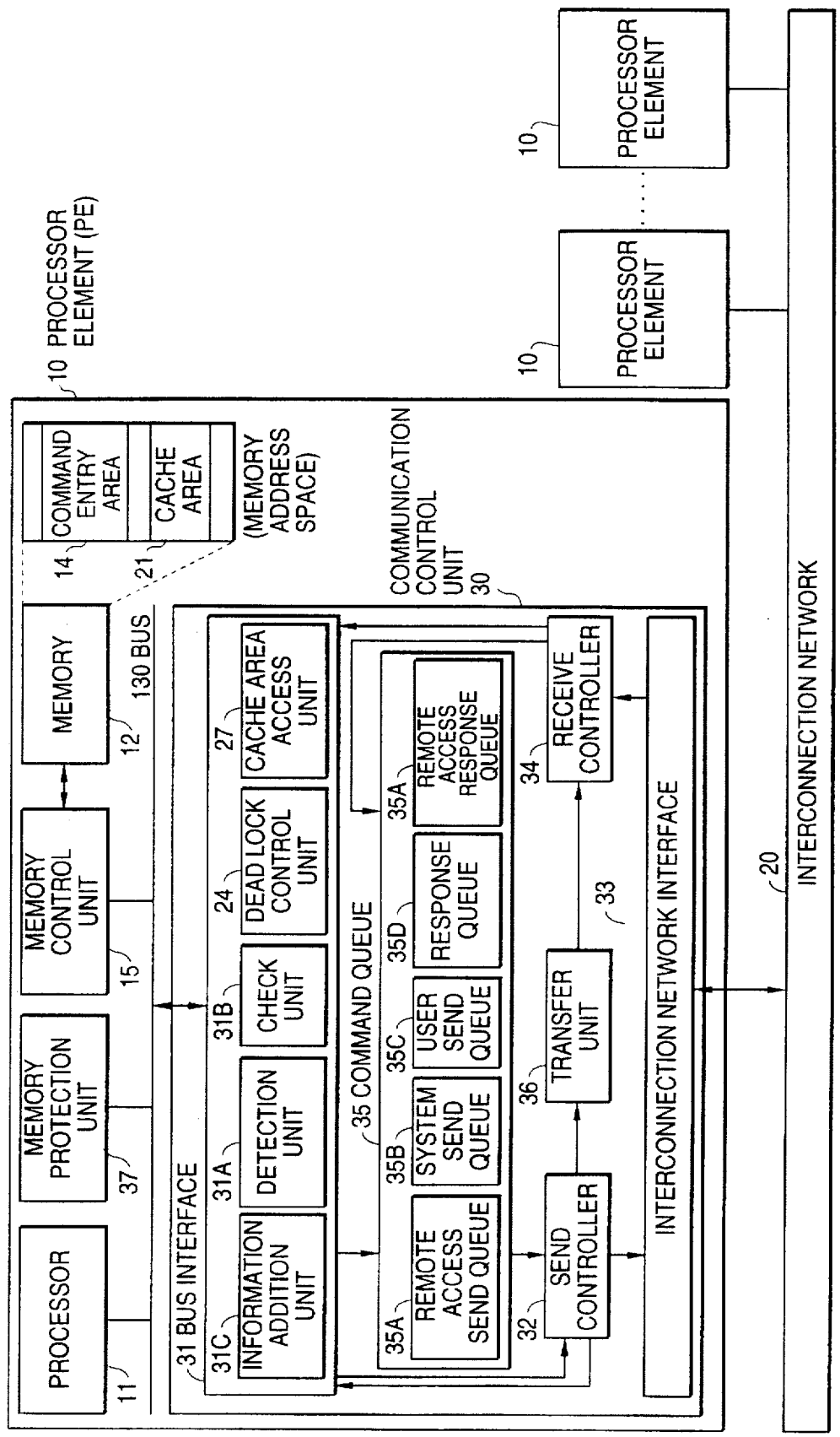
FIG. 3 is an overall configuration diagram of one embodiment of this invention, including a diagram showing the address space in memory.
Figure 4:
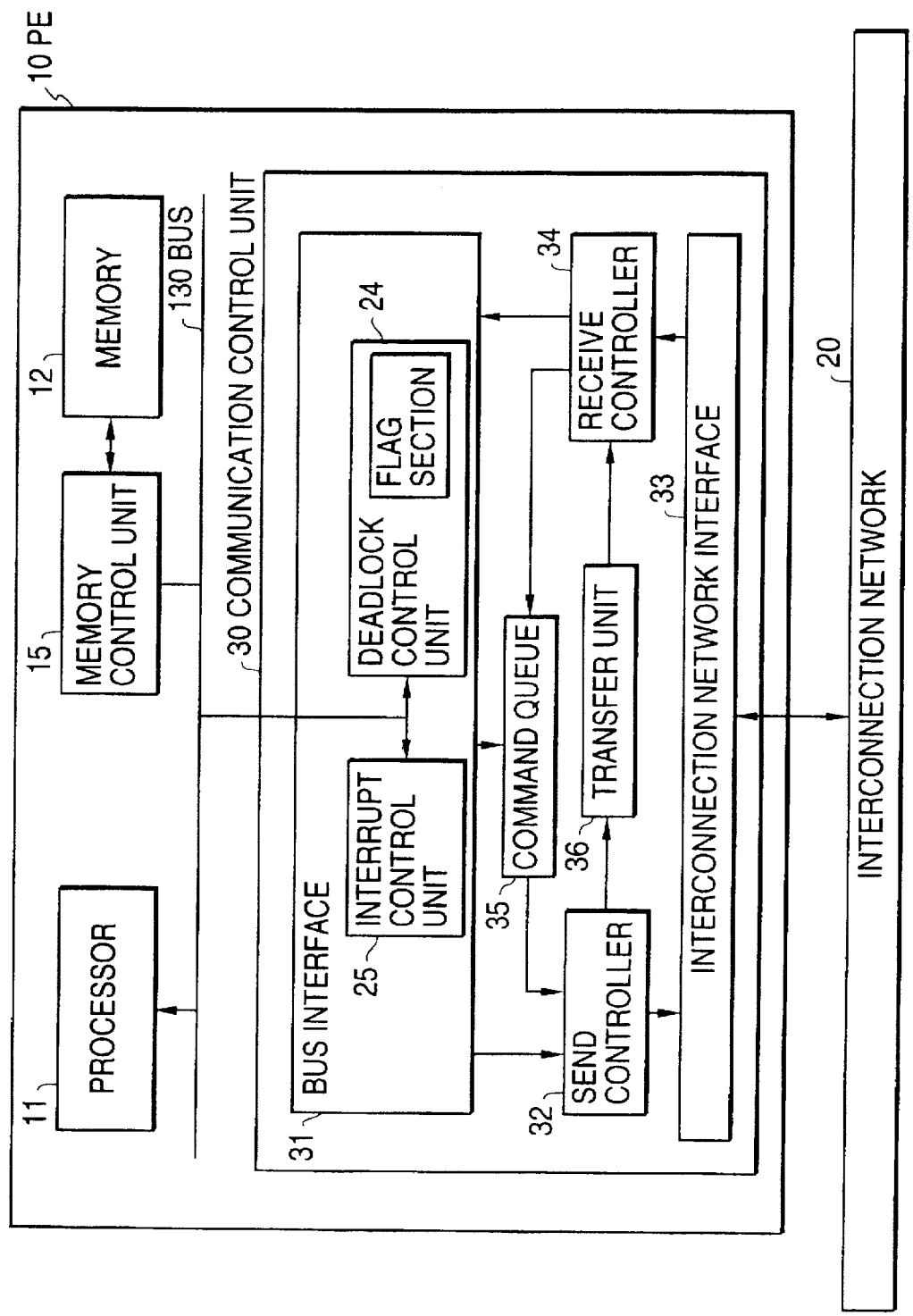
FIG. 4 is a block diagram showing only those parts necessary for explanation of the deadlock control unit.
Figure 5:
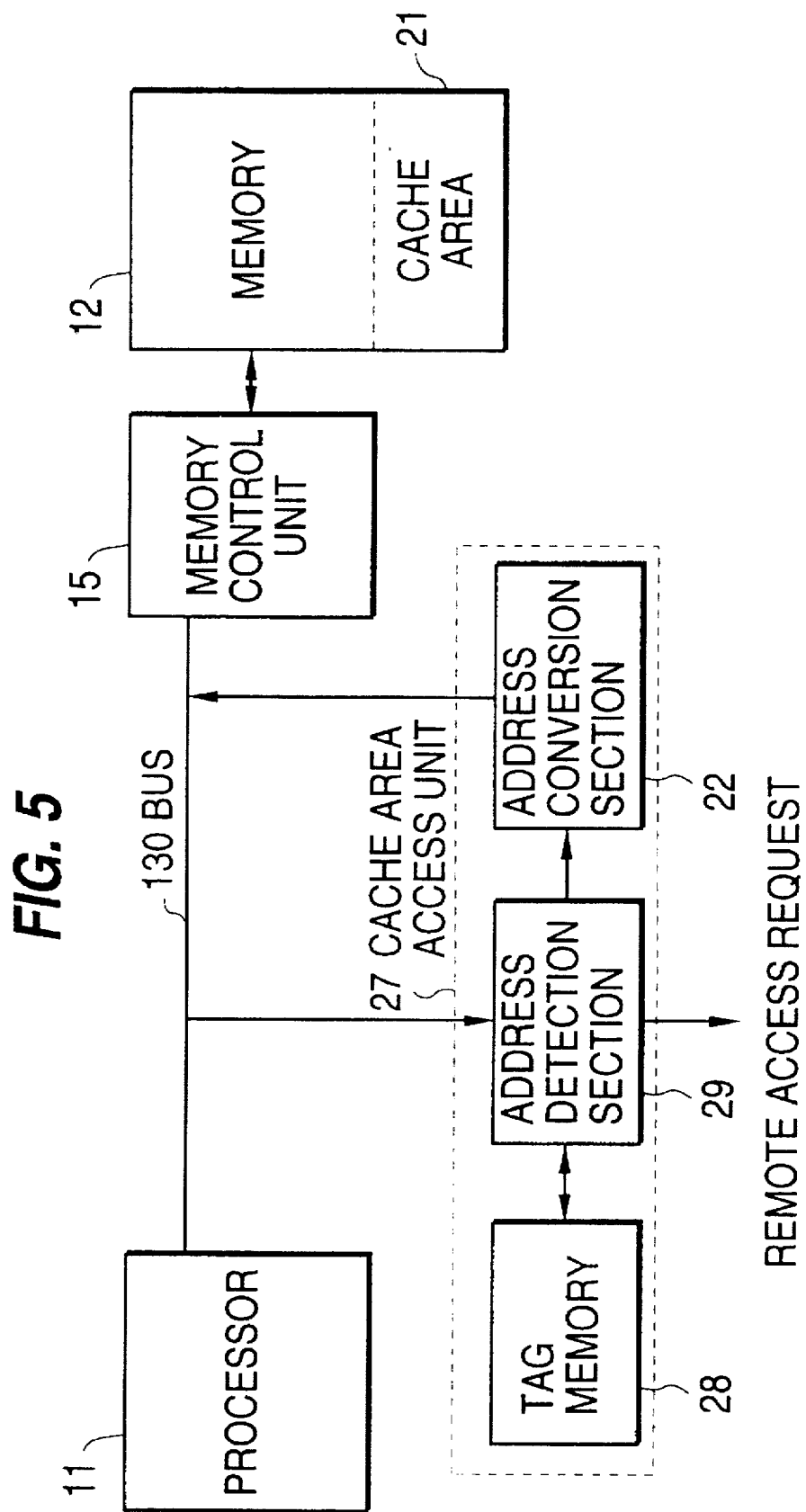
FIG. 5 is a block diagram showing those parts necessary for explanation of the cache area access unit.

First, we explain the basic configuration of this invention referring to FIGS. 3, 4 and 5; then we will explain the parts.

FIG. 3 is an overall configuration diagram of an embodiment of this invention, and includes a diagram showing the address space in memory.

In this invention, memory areas inside the memory 12 are set aside as the command entry area 14 and the cache area 21. Each address in the command entry area 14 corresponds to a type of command. The type of command is determined by the address into which the processor 11 has written the command data string. The cache area is a memory area that replaces the external cache memory that has been used in parallel computers in the past. The command entry area and the cache area will be discussed in more detail later.

The bus interface 31 detects the writing of a command data string into the command entry area 14 by the processor 11 in the processor element (PE) 10, creates a command from the command data string and, at the same time, controls the read-out/write-in of data from/to the memory 12 in the same PE10 via the memory control unit 15. The send controller 32 interprets the command that was created by the bus interface 31 and constructs a message to be sent.

The interconnection network interface 33 sends the send message constructed by the send controller 32 to the interconnection network 20, and also receives messages sent to the same PE10 from the interconnection network 20. The send controller 34 interprets messages received by the interconnection network interface 33, and stores the data transferred by the message in the designated location in the memory 12 of the same PE10 via the bus interface 31 and the memory control unit 15.

When a desired command is issued, if the processor 11 writes the command parameters etc. into the address preallocated for the desired command in the command entry area, the command can be executed by the message exchange method. Consequently, it is possible for the processor to issue commands at the user level by allocating an address area within the command entry area for the purpose of issuing commands at the user level. That is to say, since it becomes unnecessary to transfer to the system level when a command is issued, the time required for a transfer to the system level is reduced.

Further, the configuration is such that if the reception controller 34 receives a command requesting the transfer of the contents of the memory 12 in the same PE10 to another PE (a remote PE), the command is sent to the send controller 32. When the send controller 32 receives this command, the data requested by the command are read out from the memory 12 in the same PE10 via the bus interface 31, and a message to transmit the data is constructed.

The response command processing can be executed by the send controller 32, reducing the amount of hardware that is needed.

In FIG. 3, in addition a command queue 35 is provided in which the command created by the bus interface 31 is written. This makes it possible to write commands created by the bus interface 31 into the command queue 35 immediately. Accordingly, the processor 11 can issue commands continuously without waiting for the command processing by the send controller 32 to be completed, increasing the processing efficiency.

The bus interface 31 has a mechanism that, when detecting an access to the address area (shared space) by the processor 11, creates a remote access command by which the processor 11 accesses the memory 12 in the PE10. Remote access includes, for example, reference to and updating of the memory 12. The command queue 35 has a remote access send queue 35A into which the remote access command created by the bus interface 31 is written; the bus interface 31 writes the created remote access commands into the remote access send queue 35A. Consequently, the processor 11 can issue a plurality of remote access commands in succession without waiting for command processing by the send controller 32. However, in a REMOTE READ command for the processor 11 to read the contents of the memory 12 in a remote PE10, the processor 11 goes on standby while monopolizing the bus 130 until the response message to the command is received. This makes it possible for a deadlock to occur; the deadlock control unit that makes it possible to prevent this will be discussed later.

When the processor 11 is running at system level, the bus interface creates system mode communication commands from the command data strings written into the command entry areas; when the processor 11 is running at user level, it creates user mode communication commands from the command data strings written into the command entry area. Consequently, the processor 11 can control the issuance of system mode communication commands and user mode communication commands in accordance with the running level.

The command queue 35 also has a system send queue 35B in which system mode communication commands created by the bus interface 31 are written, and a user send queue 35C in which the user mode communication commands are written. The send controller 32 can take a send command from the system send queue 35B or the user send queue 35C, and execute the communication command.

Consequently, by deciding in advance whether communication commands are to be taken preferentially from the system send queue 35B or the user send queue 35C, priority can be given to processing of either system commands or user commands. In addition, since the system commands and the user commands are stored in separate queues, even if the running level of the processor 11 is changed frequently between the user level and the system level, the user mode communication commands and the system mode communication commands are correctly stored in the corresponding queues. For this reason, the processor can continuously issue these 2 types of communication commands independently of each other.

PE10 in FIG. 3 also has a transfer unit 36 that transfers command messages constructed by the send controller 32 and completed by processing inside the same PE10 to the receive controller 34 through the interconnection network interface 33.

Command messages that are constructed by the send controller 32 and completed by processing inside the same PE10 are transferred to the receive controller 34 by the transfer unit 36 without passing through the interconnection network interface 33.

Consequently, the processing can be completed at high speed inside the same PE.

The command queue 35 also has a response queue 35D into which response commands for messages set by communication commands that request the transfer of data stored in a memory 12 of the same PE10, which the receive controller 34 has received via the transfer unit 36, are written.

The send controller 32 can fetch communication commands from the response queue 35D and execute communication commands through the bus interface 31; and can issue response commands continuously without waiting for completion of processing by the send controller 32.

The command queue 35 also has a remote access response queue 35E into which response commands to the messages set by remote access commands requesting reference to the contents of the memory 12 in the same PE10, issued from a remote PE10, and received by the receive controller 34 through the interconnection network interface 33, are written by the receive controller 34. The send controller 32 fetches the remote access command from the said remote access response queue 35E, reads out the contents of the memory 12 in the same PE10 requested by the remote access command through the bus interface 31, and constructs a send message intended for the remote PE10.

Consequently, the receive controller 34 can continuously output response commands for remote access commands which request response messages received through the interconnection network interface 33 without waiting for the response controller processing to be completed.

The bus interface 31 determines the type of command according to the address of the command data string which the processor 11 writes into the command entry area 14. Consequently, it is also possible to divide the command entry area 14 into an area used for issuing user commands and an area used for issuing system commands.

The PE10 in FIG. 3 also has a memory protection unit 37 that limits the area in the command entry area 14 into which command data strings can be written when the processor 11 is running at user level. Consequently, the types of commands that can be issued at user level can be limited.

The bus interface 31 has a detection unit 31A that counts the number of command data written into the command entry area 14 corresponding to the type of command determined by the address in the command entry area 14 into which the processor 11 has written the command data string, and detects the end of the command data string. Consequently by using this detection result, issuance of the incompleted commands stored in the queue can be suppressed. In addition, a plurality of queues can be set up corresponding to the different types of commands; in this case, completed commands can be fetched from the queues in which completed commands are stored and processed. This permits excess waiting time to be reduced, increasing processing efficiency.

In addition, the bus interface 31 has a check unit 31B that checks the appropriateness of specified parts of a command data string based on the command data count. This makes it possible to prevent inappropriate commands from being issued.

The bus interface 31 also has an information adding unit 31C that adds information that is used by the system to certain parts of the command data string based on the command data count value. This makes it possible for various types of information to be embedded in arbitrary parts of command data strings.

In addition to the constituent elements discussed above, there are a cache area 21 in the memory 12, a deadlock control unit 24 in the bus interface 31, and a cache area access unit 27. The deadlock control unit 24 and the cache area access unit 27, to be discussed below, are both constituent elements that are related to the execution of remote access commands.

FIG. 4 is a configuration diagram of important parts centered on the deadlock control unit 24.

When a REMOTE READ command is issued from the processor 11, as explained above a REMOTE READ command is created in the bus interface 31 of the communication control unit 30, and, in addition, the deadlock control unit 24 starts to check whether or not an interrupt request is issued to the processor 11 by the interrupt control unit 25. If a response message arrives from the destination PE10 without an interrupt request being issued, the completion of the REMOTE READ is posted to the processor 11 as a normal result and the operation ends.

If an interrupt request is issued before the response message arrives from the destination PE10, the fact that an error occurred in access for the REMOTE READ command (abnormal termination) is immediately posted to the processor 11. When access for a REMOTE READ command ends in an error, execution of the registered procedure starts as exceptional processing, and processing to resolve the cause of issuance of the interrupt request is called. After all of the interrupt processing requests have been responded to, the exceptional processing procedure is ended, and the REMOTE READ command that ended in an error is executed. This makes it possible to respond to interrupt requests quickly.

When an error is posted, the deadlock control unit 24 sets a flag in the flag section 26 to store the fact that this situation exists in memory. The above-mentioned exceptional processing is ended and the REMOTE READ command is re-executed, but the deadlock control unit 24 prohibits REMOTE READ messages from being sent from the communication control unit 30 when a flag is set, and that access immediately becomes an error.

This is because, since a REMOTE READ command message has already been sent once, 2 messages that mean the same processing have been issued, throwing the processing procedure into confusion.

In this case, the exceptional processing procedure is started again, and the processor 11 re-executes the REMOTE READ command, but as long as a flag is set in the flag section 26, an error will occur and the re-execution will be repeated. The processor 11 also performs processing for interrupt processing requests during this time within the exceptional processing procedure.

When a response message to the first REMOTE READ command to be sent arrives, the contents of this message are discarded and, at the same time, the flag that was set is cleared. The message is discarded because the REMOTE READ command to which this message is a response has already been posted to the processor 11 as having ended in an error in response to the interrupt processing. The flag is cleared because there are no more messages remaining for which a REMOTE READ command has been issued and a response has not yet arrived.

At this time the system returns to its initial state and the REMOTE READ command that was repeatedly re-executed after the flag was cleared is re-sent as a message via the bus interface 31 of the communication control unit 30.

FIG. 5 is a configuration diagram of the important parts of the cache area access unit 27.

The processor 11 transfers the address to the address detection section 29 inside the cache area access unit 27 through the bus 130, and, at the same time, transfers the data to the memory control unit 15 through the bus 130.

The address detection section 29 compares the tag section of the address issued from the processor 11 to the tag section of the tag memory 28 and performs cache hit detection (tests whether the two agree or not). If the result of the address comparison is a cache MISS (disagreement), then, based on the address that missed, a REMOTE READ command is created by the bus interface 31, and a remote read is requested.

If the tag in the address detection 29 scores a HIT, then the address created in the address conversion section 22 is transferred to the memory control unit 15. Part of the local space of the memory 12 is set aside as the cache memory referred to above. Since this cache area 21 constitutes part of the area of the memory 12, the memory control unit 15 can access both the cache area and the memory outside of the cache area.

Consequently, since the external cache memory has been dispensed with and part of the area of the memory 12 set aside for use as the cache memory, the capacity of the cache area 21 can be made several orders of magnitude larger than that of an external cache memory. This makes it possible to reduce the frequency of cache misses (cases in which the data to be read are not stored in the cache memory), thus reducing the frequency of remote reads from the remote PE10 and increasing the operating speed of the parallel computer.

In addition, whereas until now it has been necessary to have an exclusive external cache memory control unit that is exclusively used to access the external cache memory, since the cache memory 21 now constitutes part of the memory 12, an exclusive external cache memory control unit has become unnecessary. That is to say, since the memory control unit 15 consists of a read controller, a write controller, an address controller, an address decoder, a multiplexer, etc., it has now become possible for one memory control unit 15 to access both the cache area 21 of the memory 12 and areas of the memory 12 other than the cache area 21, thus simplifying the configuration.

Now let us explain the details of the various parts of the PE related to this invention.

Figure 6:
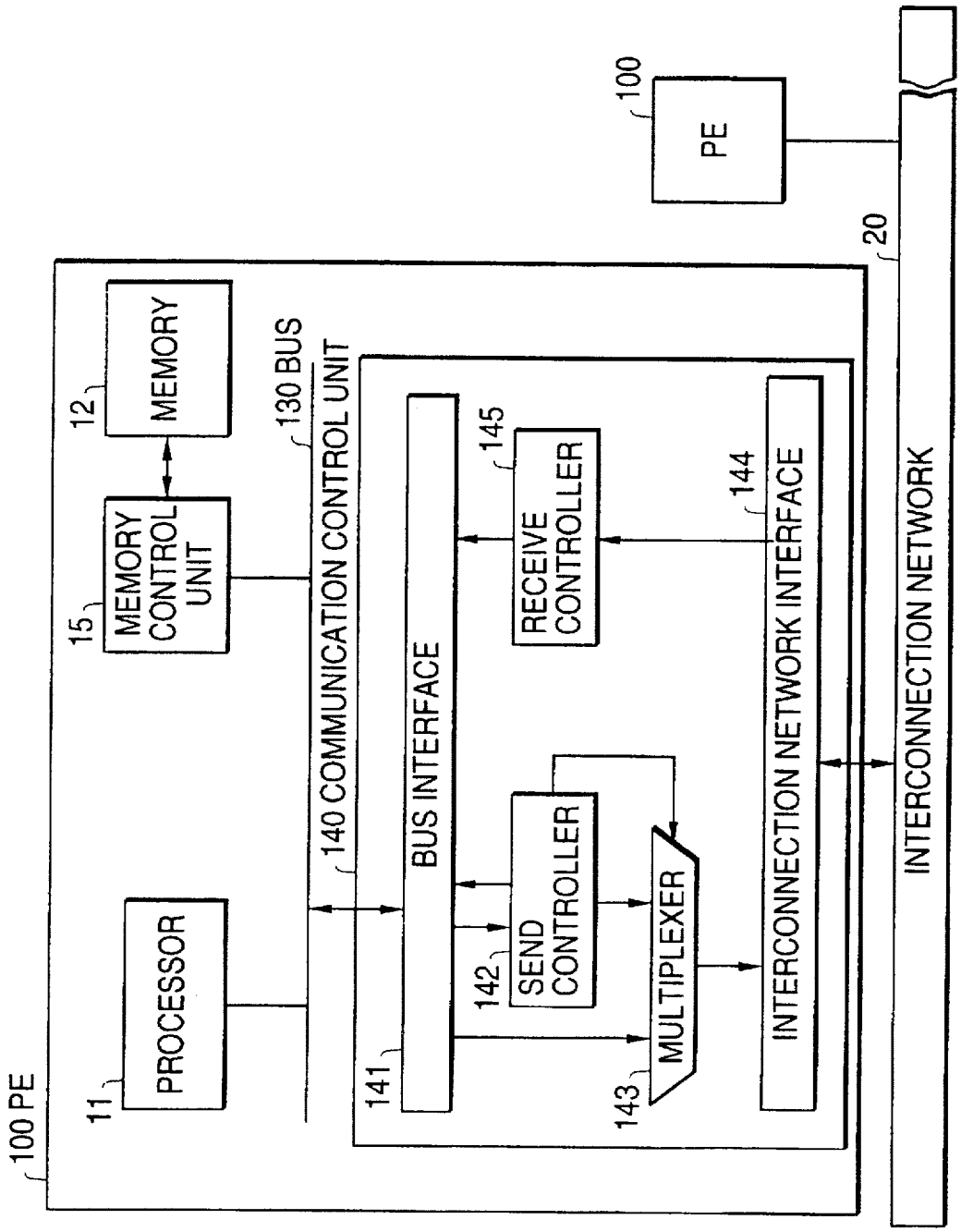
FIG. 6 is a block diagram showing the configuration of the essential parts of the 1st embodiment related to the communication control system of the access control system of this invention.

FIG. 6 shows the first embodiment related to a communication control device of the access control system of this invention, in the form of a block diagram showing the configuration of the PE100 linked to the interconnection network 20 of the parallel computer system. This figure does not show the deadlock control unit or the cache area access unit, but in fact they are present, for example inside the bus interface 141. The deadlock control unit and the cache area access unit will be explained separately later.

The PE100 includes a processor 11, a memory control unit 15 and memory 12, a communication control unit 140 and a bus 130 that connects all of these.

When the processor 11 sends a command message indicating that the contents of the memory 12 in the same PE100 are to be transferred to the memory 12 of another PE100 (a remote PE), a command data string is written in to the command entry area 150 (FIG. 7) set up on the address space in the same PE100.

The command data string consists of data of 1 word or more consisting of the parameters, data, etc. that comprise the command that indicates that the processor 110 is to execute a certain function. These parameters include, for example, <destination PE>, <message size>, <destination address>, <source address> and <other parameters>.

Figure 7:
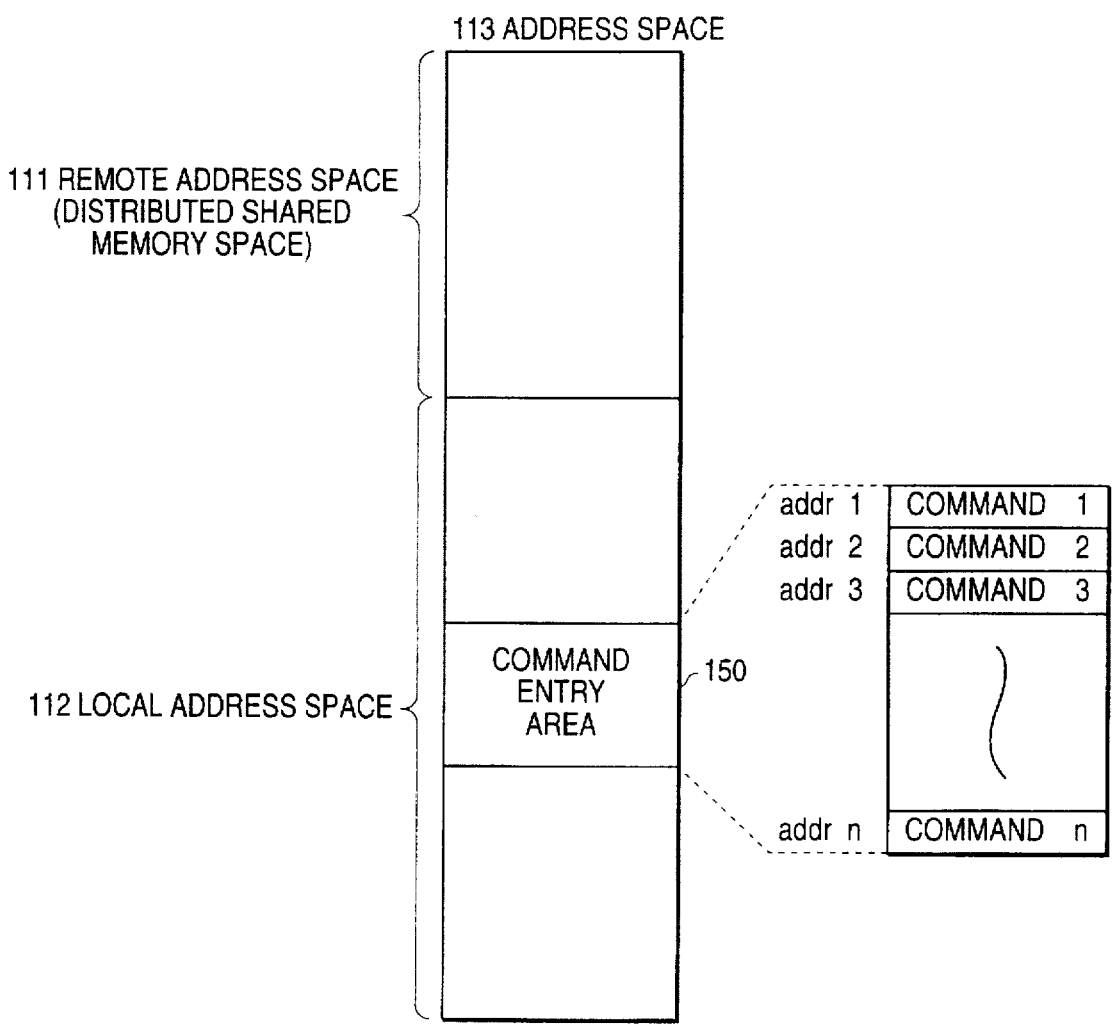
FIG. 7 is a diagram explaining the concept of command entry area.

FIG. 7 is a diagram that explains the concept of a command entry area.

The address space 113 possessed by one PE100 consists of a remote address space (distributed shared memory space) 111 and a local address space 112. The command entry area 150 is a specially specified area on the local address space 112 of the processor 110. The respective addresses in the command entry area 150 are in a 1-to-1 correspondence with the various commands. That is to say, in FIG. 7, addr1, addr2, . . . , addrn are addresses assigned to the respective commands with addr1 corresponding to command 1, addr2 corresponding to command 2 and so on, in a 1-to-1 correspondence as shown in the figure.

The processor 100 writes command data strings corresponding to the addresses in the command entry area 150 preassigned to these commands. The addresses of the memory 12 of the remote PE100 are mapped in the remote address space 111. The processor 100 can access the memory 12 of the remote PE100 by specifying addresses in the remote address space 111.

Thus, there are two methods for the processor 11 to access the memory 12 in the remote PE100: write-in of a command data string into the command entry area, and access of the memory 12 of the remote PE100 by output of an address in the remote address space (distributed shared memory space); in particular, the latter is called remote access, and commands for the purpose of performing remote access are called remote access commands.

The communication control unit 140 in FIG. 6 interprets the command data string output onto the bus 130 and written in to the command entry area 150, constructs a message for use in sending the command in a format that the communication control unit 140 of the remote PE100 can interpret, and sends this message to the interconnection network 20.

The communication control unit 140 has a bus interface 141, a send controller 142, a multiplexer 143, an interconnection network interface 144, and a receive controller 145. The bus interface 141 monitors the address signals output onto the address bus of the bus 130; if an address signal is an address in the command entry area 150, the command data string is fetched from the data bus of the bus 130, information such as the process ID (PID) is added to it and it is sent to the send controller 142. In addition, the bus interface 141 has a mechanism to access the memory 12, so that data can be read out of and written into the memory 12 via the memory control unit 150. If the contents of the memory 12 of the same PE100 are transferred to the memory 12 of the remote PE100, the transferred data are read out of the memory 12 of the same PE100 by the memory access mechanism, and output to the multiplexer 143.

The send controller 142 interprets the command data string received from the bus interface 141 to which a processor ID etc. have been added, and constructs a message to send the command to the remote PE100. Then the message is output to the interconnection network interface 144 via the multiplexer 143. In addition, if there is an instruction that the command formed from the command data string received by the send controller 142 is to transfer the contents of the memory 12 of the same PE100 to the remote PE100, then a request to read the data specified by this command out of the memory 12 is output to the bus interface 141.

The multiplexer 143 outputs the send message destined for the remote PE100 by selecting and outputting either the command output from the send controller 142 by control from the send controller 142 or the data read out from the memory 12 of the same PE100 sent from the bus interface 141, in accordance with the memory read-out request from the send controller 142 to the interconnection network interface 144.

The interconnection network interface 144 sends messages input from the multiplexer 143 to the interconnection network 20. In addition, it receives messages sent from other PE100s via the interconnection network 20, and outputs these to the receive controller 145.

The receive controller 145 interprets the message input from the interconnection network interface 144 and performs the processing corresponding to the command set by that message. Then, for example, the data transferred by this message are written into the address in the memory 12 of the same PE100 specified by the command set by the said message.

In the configuration described above, the processor 11 can execute a command at the user level by writing the command data string into a special area called the command entry area 150, on its own local address space without transferring to the system level.

Figure 8:
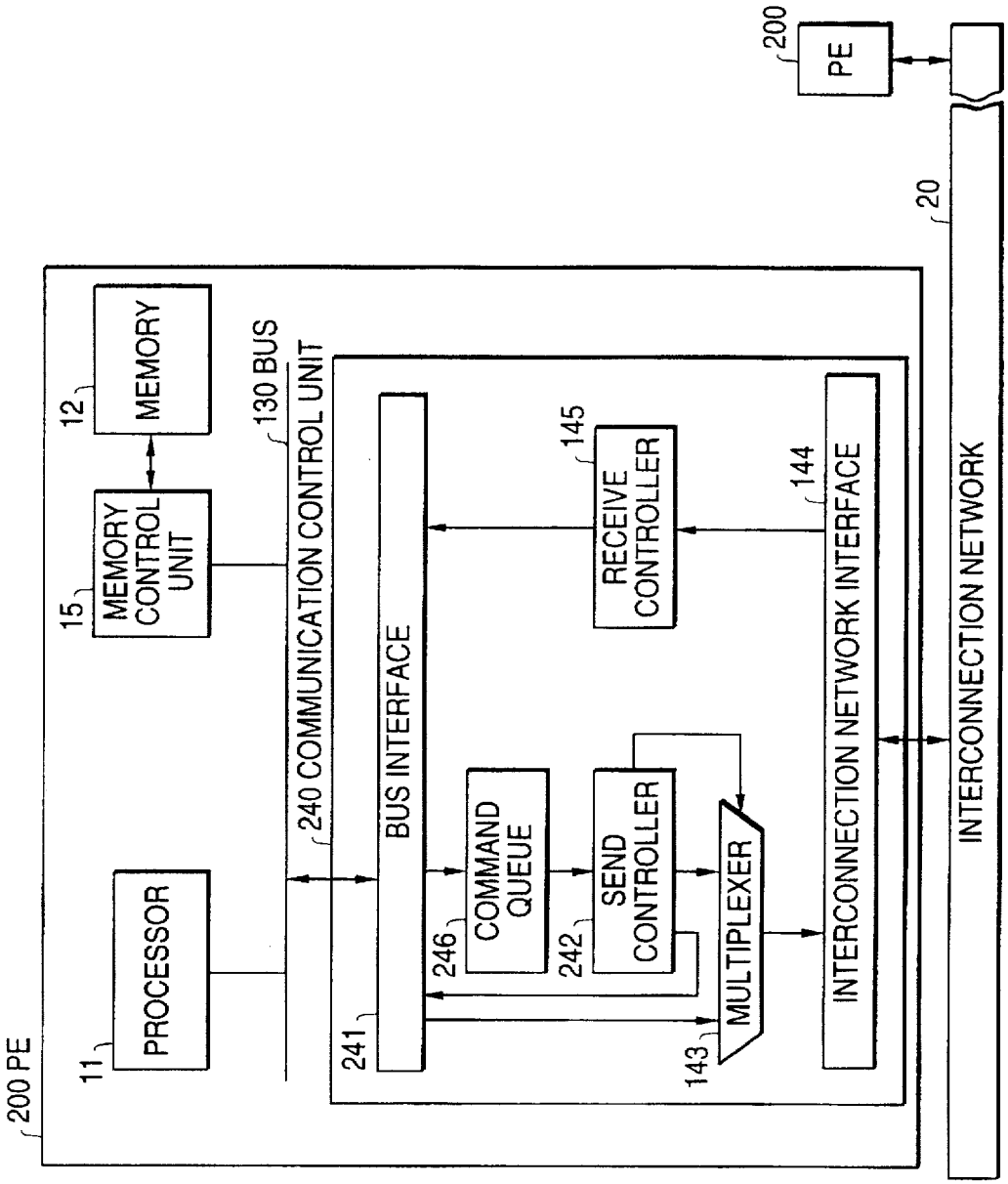
FIG. 8 is a block diagram showing the configuration of the important parts of the 2nd embodiment relating to a communication control unit of the access control system of this invention.

Next, FIG. 8 is a block diagram showing the important parts of a 2nd embodiment relating to a communication control unit of the access control system of this invention. In this figure, the same symbols are used as in the block shown in FIG. 6 described above, and a detailed explanation is omitted here. In addition, in this figure, the deadlock control unit and the cache area access unit are omitted.

The communication control unit 240 in this embodiment has a command queue 246 between the bus interface 241 and the send controller 242.

The command queue 246 is the queue into which the bus interface 241 writes command queue strings; it includes, for example, an FIFO (First In First Out) buffer. The command strings written into this queue 246 are read out to the send controller 242 according to the FIFO system.

Thus, providing the command queue 246 makes it possible for the bus interface 241 to output command data strings continuously without having to match the processing speed of the send controller 242, increasing the processing efficiency.

Figure 9:
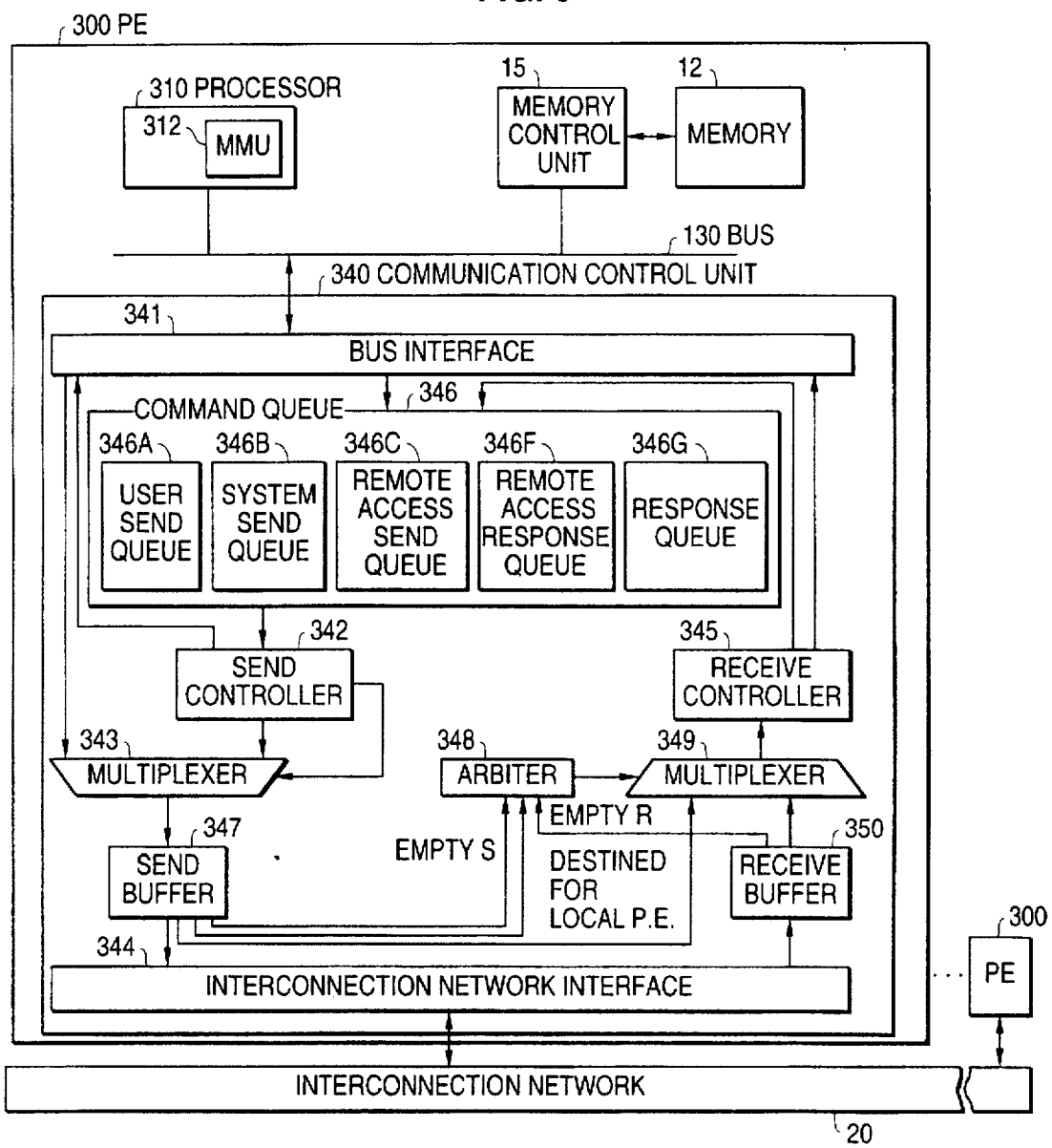
FIG. 9 is a block diagram showing the configuration of the important parts of the 3rd embodiment relating to a communication control unit of the access control system of this invention.

FIG. 9 is a block diagram showing the important parts of a 3rd embodiment relating to the communication control unit of the access control system of this invention. Also in FIG. 9, the same symbols are used for the blocks corresponding to the blocks shown in FIG. 6 and FIG. 8. The deadlock control unit and the cache area access unit are not shown.

The processor 310 has an MMU (Memory Management Unit) that protects against unauthorized access at the user level to areas to which access is only permitted at the system level in the command entry area 150 on the local address space of the processor 310. In addition, the MMU 312 has a memory protection function that prohibits unauthorized access to the command entry area 150. This MMU 312 can (but need not) be on a separate chip from the processor 310.

The bus interface 341 monitors the write-in of command data strings to the command entry area of the processor 310 by monitoring the address signals output onto the address bus of the bus 130. The type of command is determined from the written-in address; this is set as the 1st word of the command data string. In addition, a process ID (PID) is set as the 2nd word of the command data string. The PID is a unique identifier assigned to each process. When a plurality of processes are executed within a single system, the memory resources allocated to each process are distinguished from one another by this PID, thus providing a protective mechanism against access to the memory resources. A command data string created in this manner is written into the appropriate queue in the command queue 346.

The command queue 346 has 3 send queues (the user send queue 346A, the system send queue 346B and the remote access send queue 346C) and 2 response queues (the remote access response queue 346F and the miscellaneous response queue 346G).

The user send queue 346A is a queue in which the data strings for communication commands issued at the user level (user mode communication commands) are temporarily accumulated.

The system send queue 346B is a queue in which data strings for communication commands issued at the system level (system mode communication commands) are temporarily accumulated.

The remote access response queue 346F is a queue in which data strings for response commands to remote access commands to the memory 12 of the local PE300 that are sent from a remote PE300 are temporarily accumulated.

The response queue 346G is a queue in which data strings for response commands to access commands to the memory 12 of the local PE300 other than the remote access commands are temporarily accumulated.

The response commands are commands for response when, for example, a command message arrives requesting reference to the contents of the memory 12 of the local PE300. For example, a command for response to a remote access command from a remote PE300 such as the REMOTE READ command, that will be explained in detail below, is stored in the remote access response queue 346F.

Also, a response command to, for example, a communication command that requests transfer of the contents of the memory 12 of the local PE300 is stored in the response queue 346G.

The concept of "remote access" expresses the function that makes it possible for the processor 310 of a certain PE300 to directly access the memory 12 of a remote PE300 in the same manner as the memory 12 of the local PE300 (data can be read out and written in). That is to say, the processor 310 of a certain PE300 outputs an address within the remote address space (distributed shared memory space). The bus interface 341 creates a command data string for the purpose of remote access by means of hardware based on this address and the data output from the processor 310. Then a message is constructed in the same manner as for an access command other than a remote access command, and communication with the remote PE300 is carried out. A remote access command is a command that is used to execute this remote access function.

The queues 346A to 346G within the command queue 346 are selected based on an appropriate order of priority by, for example, an arbiter that is not shown in the figure, and the command data strings are output from the selected queues.

The send controller 342 receives the command data string output from the selected queue within the command queue 346 and interprets it. Then, for example, the memory 12 is accessed through the bus interface 341; the multiplexer 343 is controlled and a send message constructed, and this is then stored in the send buffer 347. That is to say, if the interpreted command data string is a command that requests transfer of data stored in an area of the memory 12 of the local PE300, the bus interface 341 will be requested to read this data out from the memory 12. The data read out from the memory 12 by the bus interface 341 are then stored in the send buffer 347 following the command via the multiplexer 343, and the send message is constructed.

Thus, the send buffer 347 stores messages for sending from the same PE300 to a remote PE300 (send messages), send messages destined for the same PE300 including data read out from the memory 12 of the same PE300, etc.

If the destination of the stored message is the local PE300, the send buffer 347 sets the self PE destination signal to be output to the arbiter 348 to ACTIVE. If a message is already stored in the send buffer 347, the empty S signal to be output to the arbiter 348 is set to INACTIVE. If the message stored in the send buffer 347 is addressed to the local PE300, it is sent as data to be input to the multiplexer 349. Then the arbiter 348 selects and outputs the message addressed to the local PE that was output from the send buffer 347 from the multiplexer 349 to the receive controller 345, by setting the local PE destination signal and the empty S signal to ACTIVE and INACTIVE, respectively, and adding them to the message. Meanwhile, the send buffer 347 outputs the message addressed to the remote PE300 to the interconnection network interface 344.

The interconnection network interface 344 sends the message addressed to the remote PE300, that has been input from the send buffer 347, to the interconnection network 20. Meanwhile, the message addressed to the same PE300 is received from the interconnection network 20, and this message is stored in the receive buffer 350.

The receive buffer 350 stores the message (received message) addressed to the local PE300 that has been input from the interconnection network interface 344 and sent from the remote PE300 via the interconnection network 20. Then, while the received message is in storage, the empty R signal is set to INACTIVE and sent to the arbiter 348.

The arbiter 348 selects and outputs either the message output from the send buffer 347 or the received message input from the send buffer 350 from the multiplexer 349, based on the empty S signal input from the send buffer 347, the local PE destination signal, and the empty R signal input from the receive buffer 350.

The receive controller 345 interprets either the message input via the multiplexer 349, stored in the send buffer 347 and addressed to the local PE300, or the message stored in the receive buffer 350, sent from the remote PE300 and addressed to the local PE300. Then, if a data transfer command that requests data transfer to the memory 12 is set in that message, the requested data are transferred to the area in the memory 12 specified by the set command via the bus interface 341 and the bus 130. Meanwhile, in the case of a message in which a command that requires a response command is set, this response command is stored in the response queue 346G or the remote access response queue 346F. That is to say, if, for example, the message is one in which a remote access command in which the processor 310 in the remote PE300 or the local PE300 requests reference to the contents of the memory 12 with respect to the local PE300 is set, that response command is written into the remote access response queue 346F. Also, if the message is one in which a command other than a remote access command requesting transfer of the contents of the memory 12 of the local PE300 to the memory 12 of the local PE300 or a remote PE300 is set, then a command for that response is written into the response queue 346G.

These response commands stored in the remote access response queue 346F or the response queue 346G are input to the send controller 342. The send controller 342 reads out the data requested by this response command from the memory 12 via the bus interface 341, writes the data into the send buffer 347 via the multiplexer 343, and constructs a response message.

Figure 10:
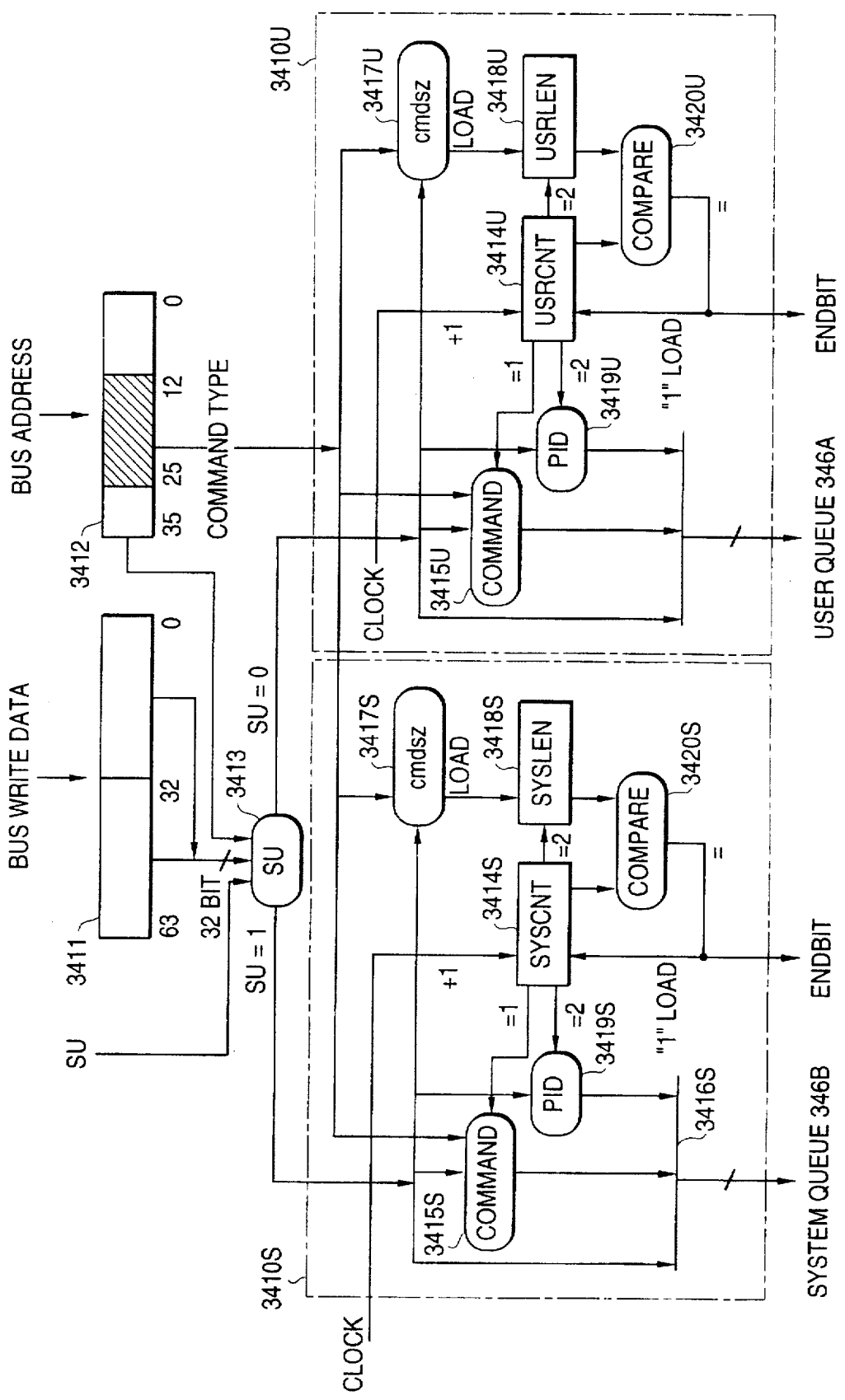
FIG. 10 is a block diagram showing the circuit configuration of the section that creates system commands and user commands inside the bus interface in FIG. 9.

FIG. 10 is a block diagram showing the circuit configuration of the section that monitors the bus 130 inside the bus interface 341 and creates communication commands (system communication commands and user communication commands).

The data bus of the bus 130 has a width of 64 bits. The address bus has a width of 36 bits. The Bus Write Data latch circuit 3411 (to be called simply the data latch circuit from now on) latches the data that the processor 310 is to output onto the data bus. The Bus Address latch circuit 3412 (referred to below as simply the address latch circuit 3412) latches the address signal that the processor 310 is to output onto the address bus. The processor 310 outputs the data to either the 0th bit–31st bit (lower word) bus line or the 32nd bit–63rd bit (upper word) bus line, within the 64-bit wide data bus. Which line the data are to be output to is determined according to the address value output onto the address bus, that is to say, the address in the command entry area into which the command data string is to be written.

On the bus 130, there is an SU flag signal line for the SU flag that indicates whether the processor 310 is to execute a process on the user level or the system level. This SU flag signal line is set to "0" when the processor is on the user level, "1" when it is on the system level.

If the processor 310 is to issue a communication command (a user communication command or a system communication command), then, as explained above, the data string corresponding to that command is written into the command entry area preset on the local address space.

Figure 11:
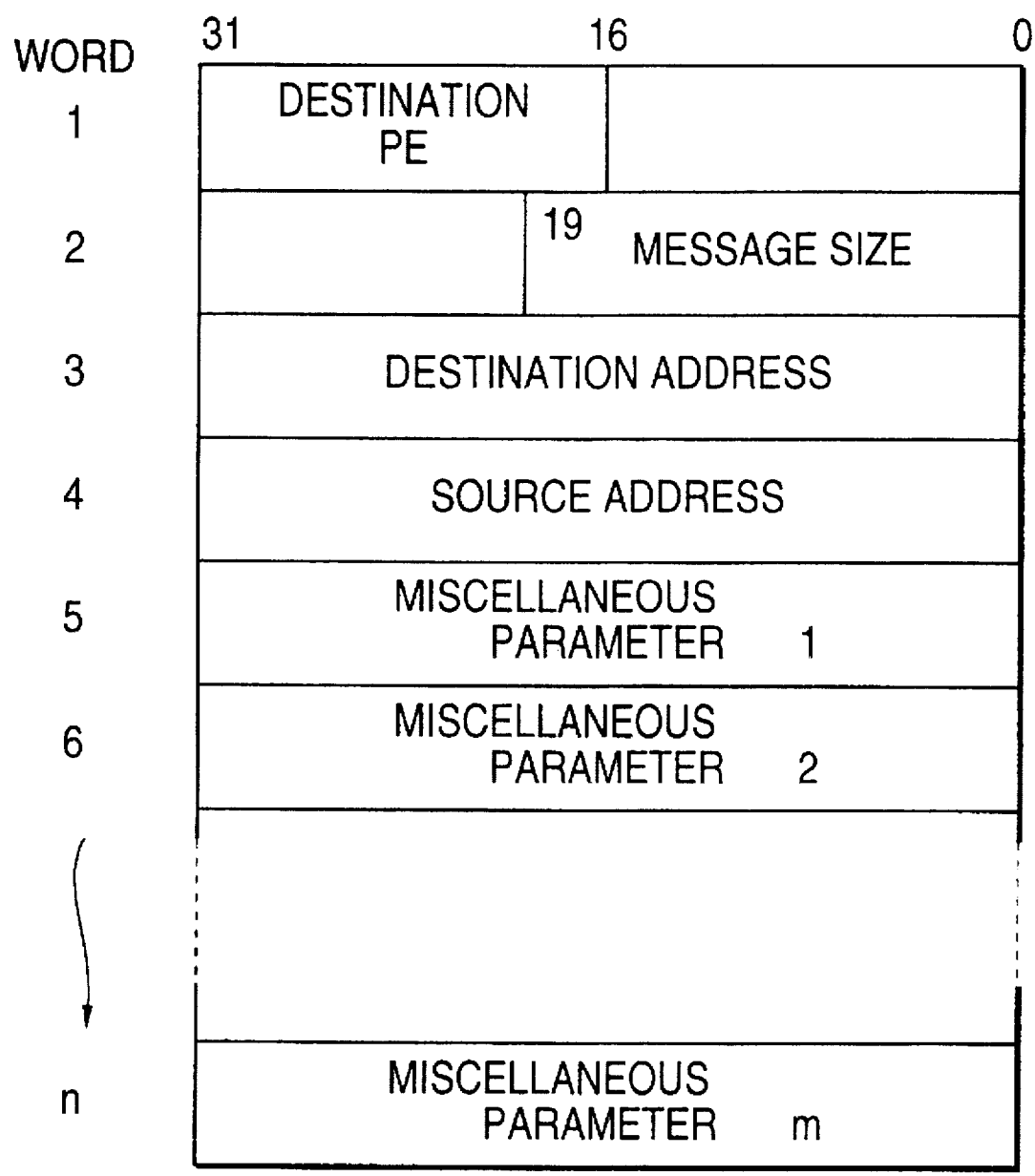
FIG. 11 is a diagram explaining the format of a command data string which the processor outputs on the data bus.

FIG. 11 is a diagram showing one example of a format of a command data string that the processor outputs onto the data bus.

The processor 310 outputs the command data from the 1st word (32 bits wide) to the nth word shown in the figure in succession.

Information identifying the destination PE, that is, the PE300 to which the command is to be sent, is set in the 1st word, from the 16th bit to the 31st bit.

The message size is set in the 2nd word, the 0th bit to the 19th bits.

The destination address, source address and other parameters 1, 2, . . . , m are set in the 3rd and subsequent words.

The destination address referred to here is the transfer destination address for data on the memory 12; the source address is the transfer source address for data on the memory 12.

The bus interface 341 constantly monitors the addresses output onto the address bus of the bus 130; when the address is detected to be an address within the command entry area, the data and address, respectively, are fetched from the data bus and the address bus of the bus 130; these are then latched by the data latch circuit 3411 and the address latch circuit 3412, respectively. The SU flag analysis circuit 3413 refers to the SU flag signal line on the bus 130 and judges whether the datum currently output onto the data bus is a user level command or a system level command. When the SU flag is "1", reference is made to the address value latched by the address latch circuit 3412, and the command data to be written into the command entry area are fetched from the upper word (32nd bit to 63rd bit) or the lower word (0th bit to 31st bit) of the data latch circuit 3411. This command datum is output to the multiplexer 3416S.

The SYSCNT circuit 3414S in FIG. 10 is a counter that does the counting necessary to create a system level communication command according to the clock signal input from the sequencer (not shown in FIG. 10) that controls the overall action timing of the bus interface 341; it is set to "1" as the initial value. This counter value indicates the word position of the communication command that is currently being processed.

Figure 12:
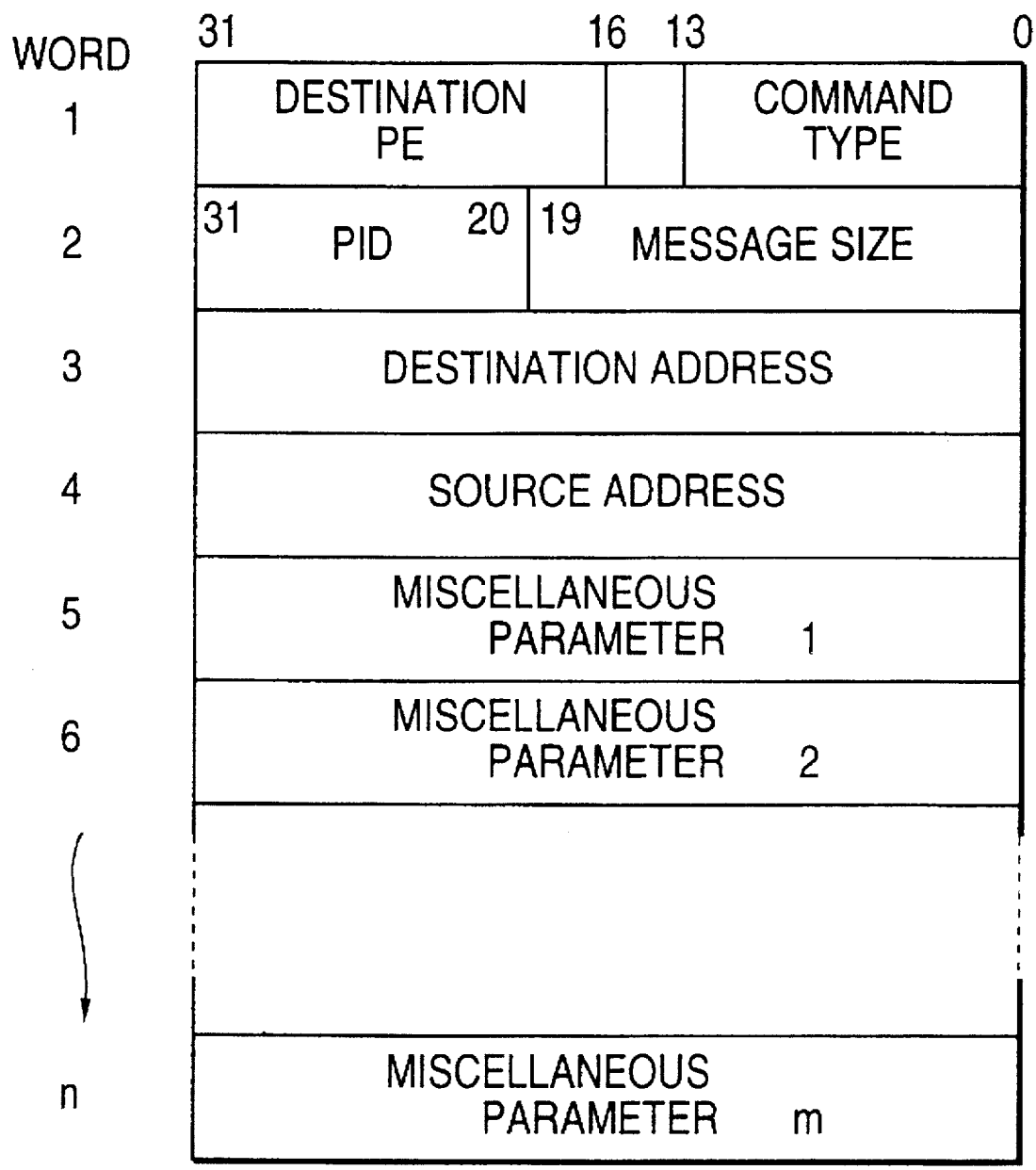
FIG. 12 is a diagram explaining the format of a system level communication command created by the bus interface.

When a count value of "1" is input from the SYSCNT circuit 3414S, the command-type embedded circuit 3415S (referred to hereafter as the command circuit 3415S) fetches the 1st word datum of the command shown in FIG. 11 from the data latch circuit 3411 and pads the 14-bit command-type datum read in from the address latch circuit 3412 in the 0th through 13th bits of the datum as shown in FIG. 12. This "command-type" datum consists of 7-bit information indicating the type of command and several flags. Then the 1st word of the communication command in which the command-type datum has been set in this manner is output to the multiplexer 3416S. The multiplexer 3416S is controlled by an arbiter that is not shown in the figure. It creates and outputs commands as shown in FIG. 12. The said arbiter performs selection control of the multiplexer 3416S based on count value information from the SYSCNT circuit 3414S.

In addition, the command-type datum is input into and held in the cmdsiz circuit 3417S.

Next, the 2nd word datum of the system level communication command shown in FIG. 11, that is written into the command entry area, is latched by the data latch circuit 3411. This datum is input into the PID embedded circuit 3419S via the SU flag analysis circuit 3413, and at the same time is also input into the cmdsiz circuit 3417S. The cmdsiz circuit 3417S finds the command data length, that is to say the word length (command size) of the data string that forms the command, from the message size information set in the 0th to 19th bits of this 2nd word and the command-type datum that has already been input and held.

In addition, a clock pulse is added to the SYSCNT circuit 3414S by latching of the 2nd word datum of the system level communication command by the data latch circuit 3411, and the SYSCNT circuit 3414S is incremented to "2".

This count value "2" in the SYSCNT circuit 3414S is added to the SYSLEN circuit 3418S as a load signal, and the SYSLEN circuit 3418S inputs the said command size from the cmdsiz circuit 3417S and holds it.

In addition, the SYSCNT circuit 3414S count value "2" is also input to the PID embedded circuit 3419S (referred to hereafter as the PID circuit 3419S). When this input is added, the PID circuit 3419S inputs the 2nd word datum shown in FIG. 11 from the data latch circuit 3411 via the SU flag analysis circuit 3413. Then the PID information held in a register that is not shown, is set in the 20th to 31st bits of this datum (refer to FIG. 12). Then, after this setting, the datum is output to the multiplexer 3416S. When the process is switched, the processor 310 sets the ID of the new process to be executed after the switching (the PID information) in the register.

As explained above, the 1st word datum and the 2nd word datum of the command shown in FIG. 12, formed by the command circuit 3415S and the PID circuit 3419S, respectively, are successively selected and output by the multiplexer 3416S and input to the system send queue (the System Queue) 346B.

Next, the 3rd and subsequent data words of the system level communication command are successively latched by the data latch circuit 3411. These data are input directly to the multiplexer 3416S through the SU flag analysis circuit 3413. Then they are successively selected and input to the system send queue 346B by the multiplexer 3416S.

When the last datum of the system level communication command is latched by the data latch circuit 3411 and input to the multiplexer 3416S via the SU flag analysis circuit 3413, the SYSCNT circuit 3414S count value is input to the SYSLEN circuit 3148S and becomes the same value as the command size that is held.

When the SYSCNT circuit 3414S count value and the SYSLEN circuit 3418S command size value become equal, the compare circuit (comparator) 3420S outputs the end bit datum set to the currently valid value (for example, "1"). This end bit datum is added to the preset signal for the SYSCNT circuit 3414S, and the SYSCNT circuit 3414S value is preset to "1".

Thus, the communication command is written into the system send queue 346B in a format such as that shown in FIG. 12.

A circuit 3410U (user communication command creation circuit 3410U) similar to the above-described circuit 3410S (system communication command creation circuit 3419S) which creates system level communication commands and consists of the SYSCNT circuit 3414S, the command circuit 3415S, the multiplexer 3416S, the cmdsiz circuit 3417S, the SYSLEN circuit 3418S, the PID circuit 3419S and the compare circuit 3420S, is provided as the unit which creates user level communication commands. In this circuit 3410U, the block corresponding to each block of the circuit 3410S is shown with the final "S" changed to "U".

When the processor 310 successively writes communication command data strings into the command entry area at user level, the SU flag signal line on the bus 130 is set to "0". When this happens, the SU flag analysis section 3413 outputs the user level communication command data string that has been latched by the data latch circuit 3411 and output to the processor 310 to the circuit 3410U. Then the action that takes place in the circuit 3410U is similar to that described above in the circuit 3410S: the circuit 3410U pads the command-type datum latched in the 12th to 25th bits of the address latch circuit in the 1st word, and the "PID information" latched in the internal register in the 2nd word, and creates a user level communication command. Then this communication command data string is input to the user send queue 346A. In addition, the end of the input of this communication command data string to the user send queue 346A is detected by the compare circuit 3420U (the output of the end bit set as the currently valid value).

The above-mentioned end bit may be added to each word of the user level or system level send command and stored in the user send queue 346A or the system send queue 346B. This permits the send controller 342 to easily detect the end of each command. It is also possible to add a counter, not shown in the figures, and use this counter to count the number of packets stored in the send queue 346A or 346B.

Figure 13:
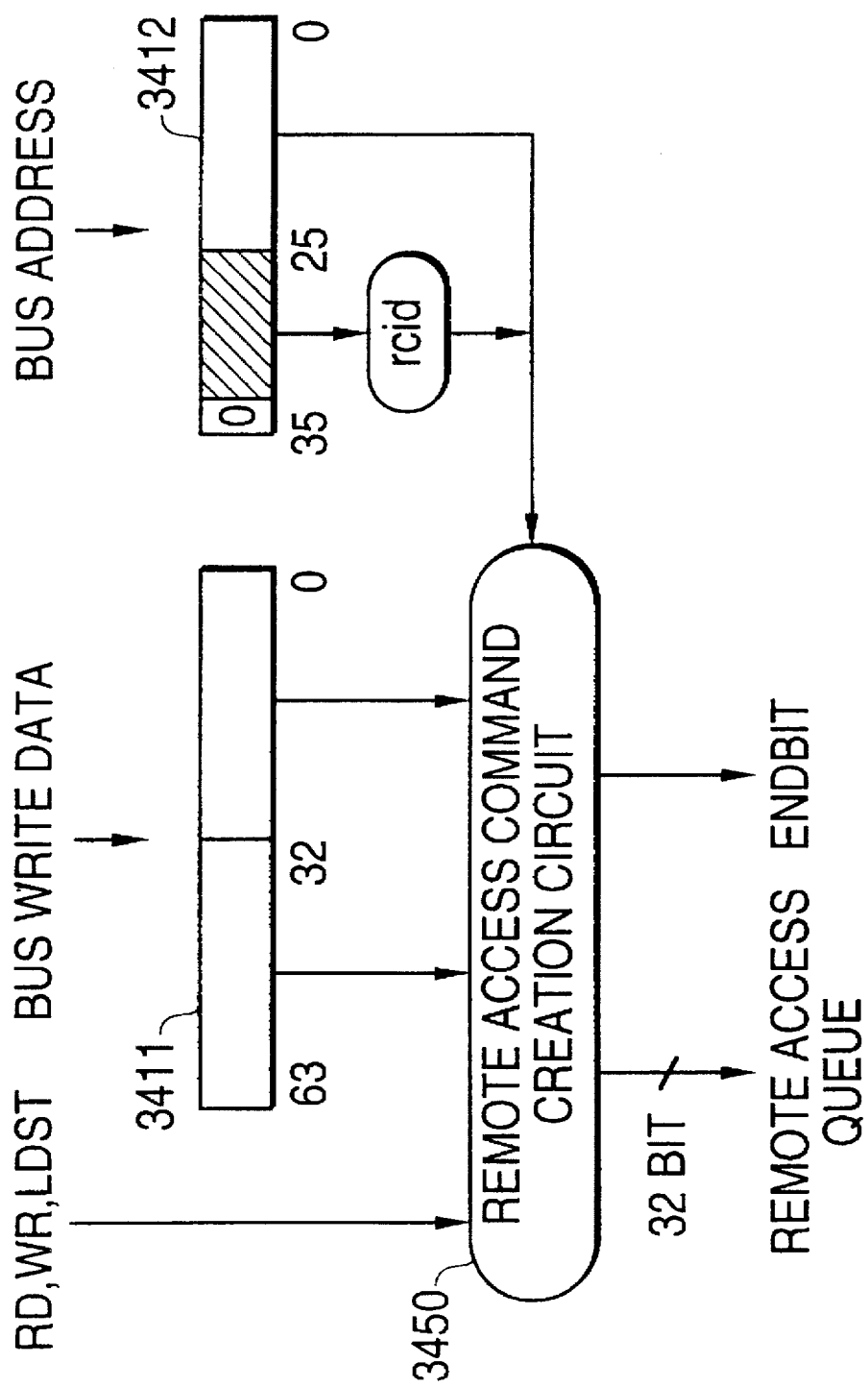
FIG. 13 is a block diagram showing an abbreviated configuration of the section that creates remote access commands in the bus interface.

Next, FIG. 13 is a diagram that shows the unit that creates remote access communication commands stored in the remote access send queue 346C in the bus interface 341, in simplified form.

The processor 310 accesses a preset address area (remote address space or distributed shared memory space) on that address space.

Figure 14:
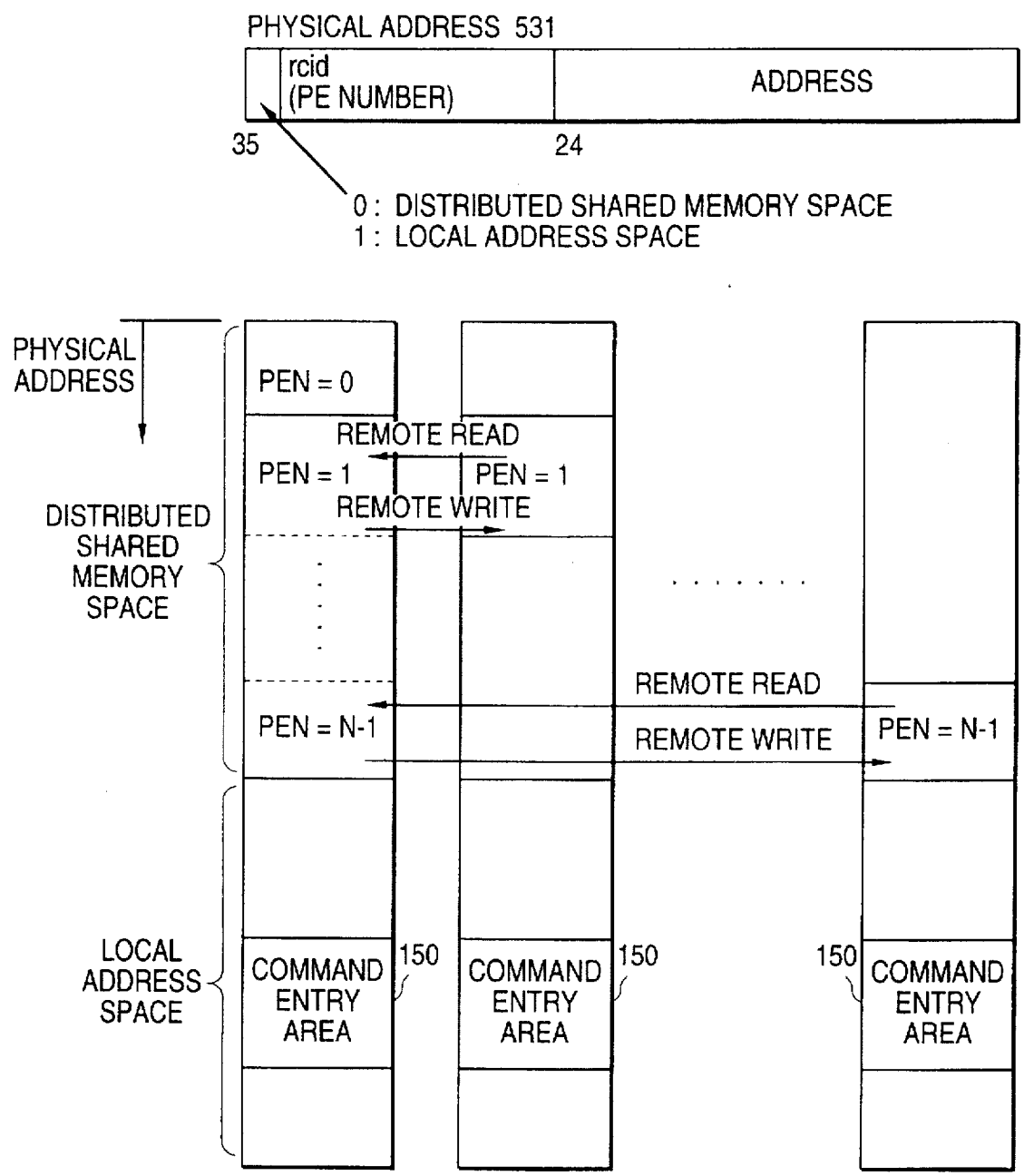
FIG. 14 is a diagram explaining distributed shared memory space.

FIG. 14 is an explanatory diagram of the distributed shared memory space of the parallel computer of this invention. Here we explain the distributed shared memory spacer, using FIG. 14, before explaining the creation of remote access commands with reference to FIG. 13.

The physical address (address signal) 531 which the processor 310 outputs onto the address bus, consists of the memory address in bits 0 to 24, the identification information rcid of the destination PE300 in bits 25 to 34, and a bit which indicates whether the memory space is distributed shared memory space (0) or local space (1) in bit 35 (MSB). When a processor 310 such as described above is to write a command data string into the command entry area, the output address MSB is set to 1.

The following explanation assumes that each rcid is a unique number attached to each PE.

An address space (memory space) for which the PE number, which is the rcid, is 0 consists of a local space and a distributed shared memory space, as explained above. Within this distributed shared memory space, the distributed shared memory space in the PE of PE number 0 is memory (PEN=0); the distributed shared memory space in the PE of PE number 1 is shared memory (PEN=1). Similarly, the distributed shared memory space in the PE of PE number N−1 is shared memory (PEN=N−1). Shared memory within the memory of each PE of PE number 0 to N−1 can also be accessed from other PEs; in that sense the shared memory is distributed among the PEs. Within the memory space of each PE, there is a command entry area 150 within the local space, as shown in FIG. 7.

Next, let us return to FIG. 13 to continue the explanation.

In remote access, the uppermost bit (MSB) of the 36-bit address signal output onto the address bus of the bus 130 is set to "0". In addition, the identification information rcid of the destination PE300 of this remote access command is set in the 25th to 34th bits of the address signal; the address on the memory 12 of the destination PE300 is set in the 0th to 24th bits. Accordingly, a specified address in the memory 12 of a specified PE300 can be accessed by means of the 0th to 34th bits of the address signal.

In a remote access command, the processor 310 refers to and updates the contents of the memory 12 of the remote PE300. There are also commands that realize such functions as exchange of data with the contents of a memory 12 of a remote PE300; these are specified by the signal wires for the RD signal, the WR signal and the LDST signal on the bus 130, respectively.

The remote access command creation circuit 3450 inputs and analyzes data which is latched by the data latch circuit 3411, and the processor 310 has written in to an area on the distributed shared memory space, the access address on the distributed shared memory space that is latched by the address latch circuit, and the states of the RD signal, the WR signal and the LDST signal on the bus 130, then creates the remote access communication command (remote access command) issued by the processor 310, using internal hardware that is not shown in the figures. Then the created remote access command is written into the remote access send queue (Remote Access Queue) 346C. In addition, the end of the remote access command is posted by an end bit. The commands that can be created include REMOTE READ, by an RD signal; REMOTE WRITE, by a WR signal; and REMOTE SWAP, by an LDST signal. In the case of a REMOTE WRITE command, both the upper word and the lower word of the datum latched by the data latch circuit 3411 are currently valid. In this case, the upper word and the lower word are read out, in that order, from the data latch circuit 341, and then written into the remote access send queue 346C, by the remote access command creation circuit 3450.

Figure 15:
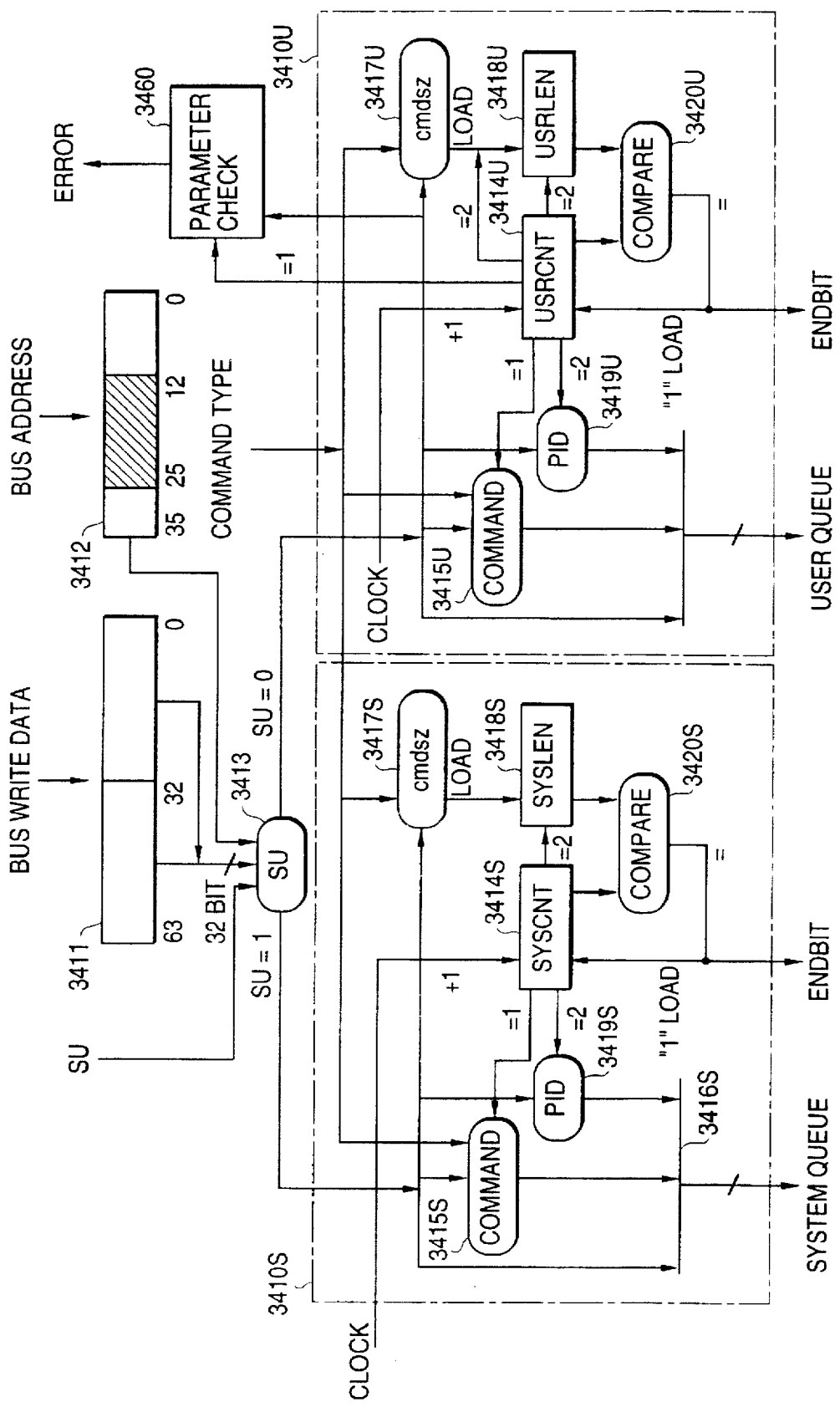
FIG. 15 is a block diagram showing the circuit configuration of a bus interface to which a parameter check function has been added.

Next, FIG. 15 is a block diagram that shows the circuit configuration of the bus interface 341 which has a protective mechanism to prevent invalid commands from being created (issued) by the user communication command creation circuit 3410 shown in FIG. 10. In this figure, the symbols used are the same as in the corresponding blocks in FIG. 10, so a detailed explanation is omitted.

In the block diagram in FIG. 15, the parameter check circuit 3460 is newly added. The count value in the USRCNT circuit 3414U is input from that circuit into the parameter check circuit 3460. When the count value is "1", the 1st word datum of the command created by the command circuit 3415U is input from this circuit. Then the value of that datum is examined; if its value is invalid, outside of the preset limits, then it is judged that an invalid command has been created, and an error signal is output to the processor 310 via the bus 130.

Then the processor 310 executes the appropriate processing for the case in which the invalid command was created.

Figure 16:
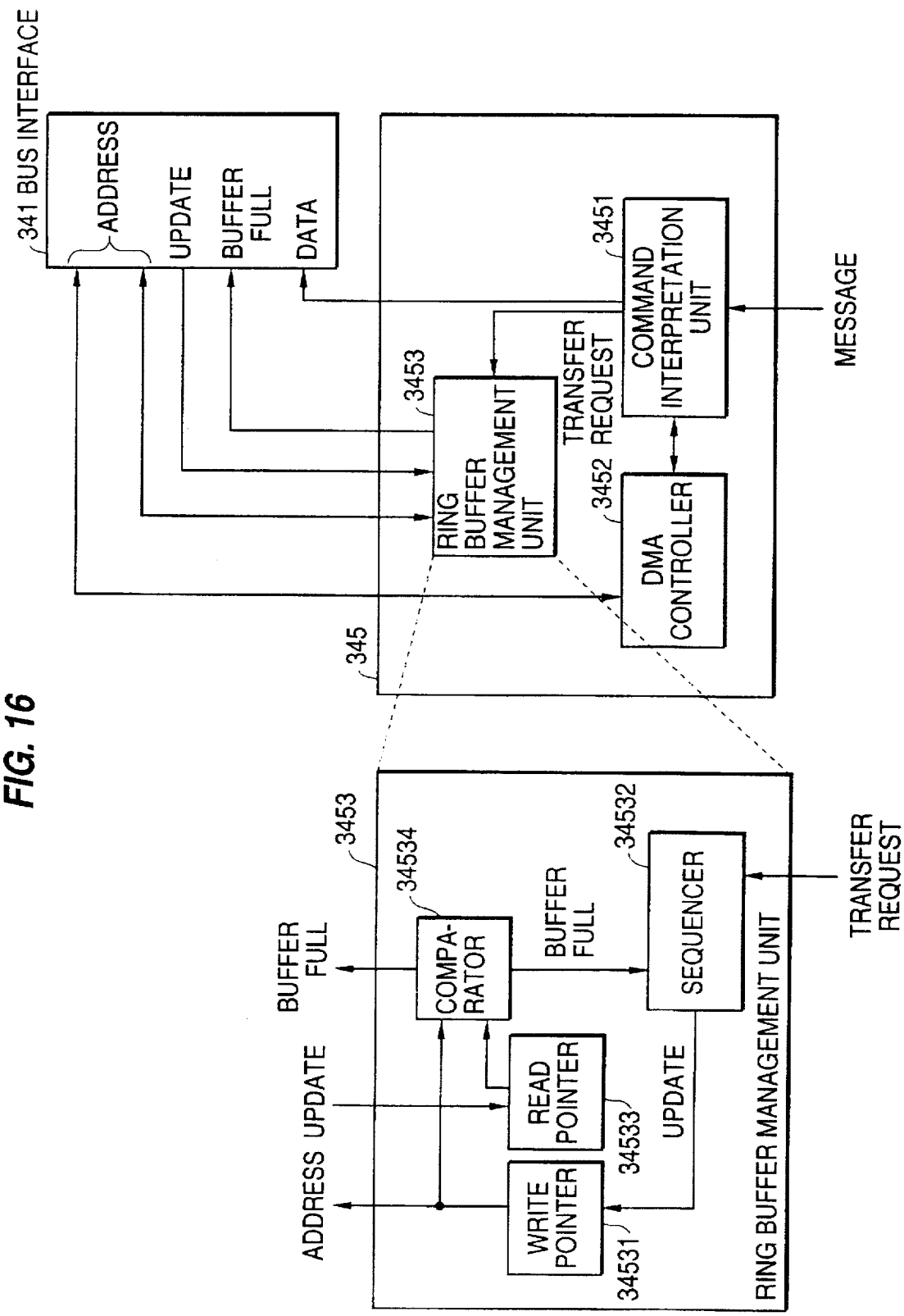
FIG. 16 is a block diagram showing the circuit configuration of a reception controller.

Next, FIG. 16 is a diagram showing an example of configuration of the receive controller 345 that transfers data destined for a remote PE300.

Figure 17:
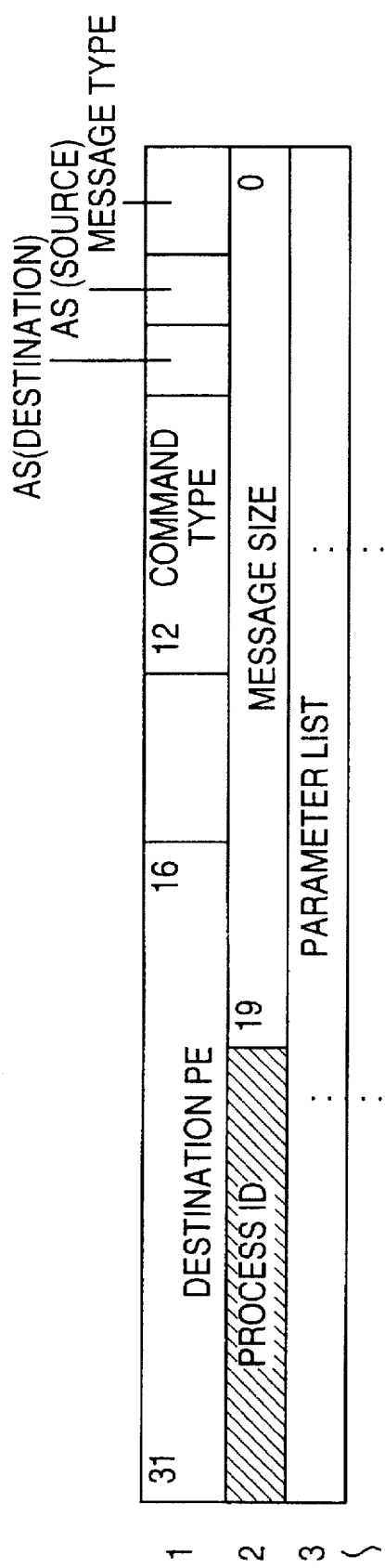
FIG. 17 is a diagram showing the format of a remote access command.
Figure 18A:
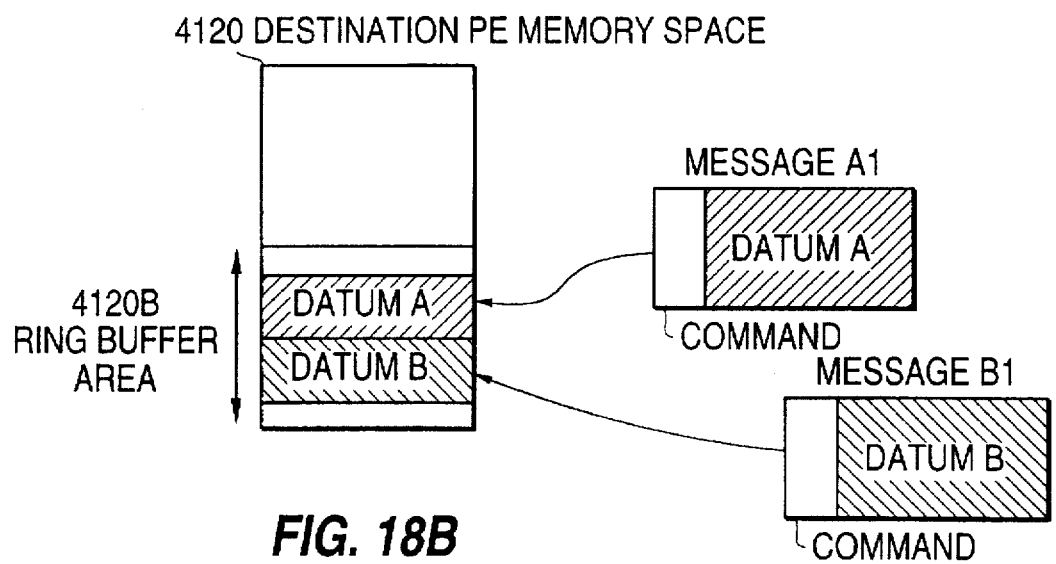
FIGS. 18A and 18B are, respectively, diagrams explaining the data transfer method using a ring buffer and the data transfer method in which the address is specified directly.

First, let us explain FIGS. 17, 18A and 19; then we will return to the explanation of FIG. 16.

FIG. 17 shows an example of the format of a command relating to the transfer, etc., of data received by the receive controller 345. Information on the Destination PE is set in the 16th bit to the 31st bit of the 1st word of this command. The above-mentioned rcid is set in this destination PE. In addition, part of the information of the command-type data indicating the command-type and consisting of the message-type, AS (source) and AS (destination), is set in the 0th bit to the 6th bit.

AS (Source), consisting of 2 bits, is the field in which the information that specifies the transfer data read-out location is set.

AS (Destination), consisting of 2 bits, is the field that specifies the location where data that comes in via transfer is to be stored.

One of the values "00", "10", "11" is specified for each of these AS fields. 00: Logical Memory/10: Ring Buffer/11: CPU The Ring Buffer is an area for temporary storage of data in the receiving side PE in communication by the "Message Exchange Method". If the Ring Buffer is designated as an AS (Destination), then it is not necessary to specify a transfer destination address on the memory 12 in the destination PE300.

Meanwhile, if "Logical Memory" is designated as the AS (Destination), it is necessary to clearly specify the transfer data storage address on the memory 12 for the destination PE300.

If "CPU" is designated as the AS (Destination), it means that the data are sent directly to the processor 11 in the destination PE300.

Next, let us explain the "message-type".

The message-type specifies a command such as the following by means of a 3-bit value.

000: PUT/001: GET/010: REMOTE WRITE/011: SWAP/ 100: CSI 101: FOP/111: No Header

PUT: A data send command for transfer the contents of the memory 12 of the local PE300 to the memory 120 of a remote PE300.

GET: A data receive command to transfer the contents of the memory 12 of a remote PE300 to the memory 120 of the local PE300 or to return them to the processor 310 of the local PE300 (corresponds to the REMOTE READ command mentioned above).

REMOTE WRITE: A command (corresponding to the REMOTE WRITE command mentioned above) for the processor 310 of the local PE300 to write data in to the memory 12 of a remote PE300.

SWAP: A command (corresponding to the REMOTE SWAP command mentioned above) to exchange data with the memory contents.

CSI (Compare and Swap Instruction): Contents are read out from a memory 12, and compared with specified data. Then, if they are equal, they are written in to a memory 12 provided for data storage. The contents of the memory 12 from which the data were first read out are returned.

FOP (Fetch and Operation): The contents are read out from a memory 12, and then operated on by an operation specified by a parameter (a logical operation such as AND, OR, etc.). After this operation, the data are written into a memory 12. The contents of the memory 12 that were first read out are returned.

No Header: A special command that a message header (part of a command) is not to be created. Only the data are sent.

Among these commands, GET, REMOTE WRITE and SWAP correspond to remote access commands. However, in the case of GET, a command to transfer received data to a memory 12 does not correspond to a remote access command. That is to say, the GET command corresponds to a remote access command if the message-type is GET and the AS (Destination) is "CPU".

FIG. 18A explains the data transfer method in the case in which "Ring Buffer" is specified. When "Ring Buffer" is specified and data A and B are transferred to a remote PE300, then, as shown in FIG. 18A, the data A, B of the messages A1, B1 in which the transferred data A, B have been added directly to the command, are continuously stored in the Ring Buffer area 4120B on the memory 12 in the order of arrival.

Figure 18B:
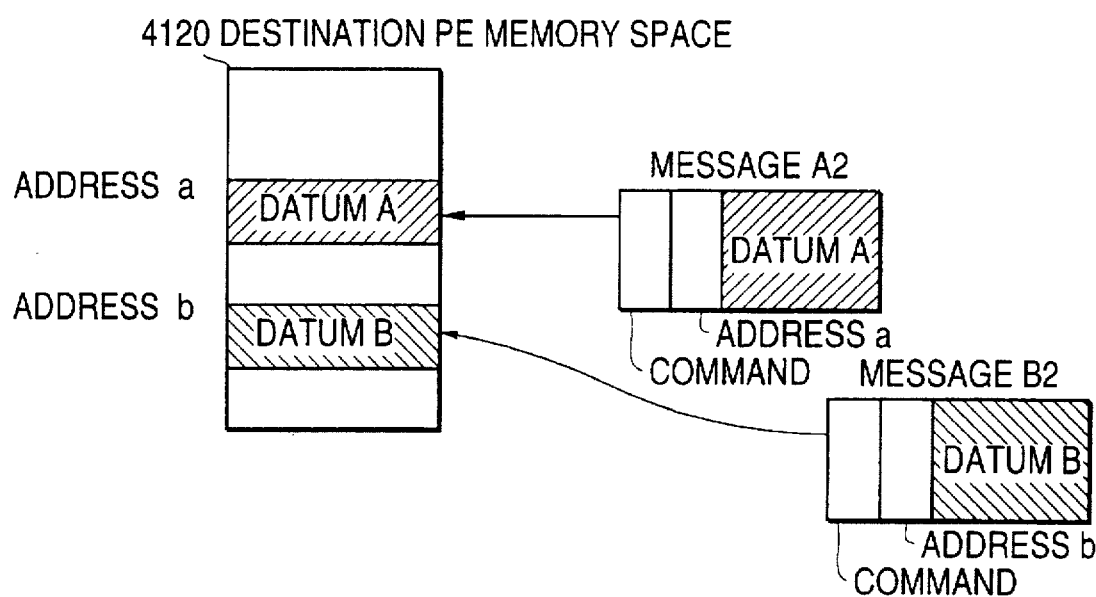

Meanwhile, in the case of data transfer to a specified storage address, shown in FIG. 18B, when the same data A, B are transferred to a remote PE300, it is necessary to clearly specify the storage addresses a, b for the data A, B on the memory 12 of the destination PE300 in the messages A2, B2. When the destination PE300 receives the messages A2, B2, the data A, B are stored in the addresses a, b on the local memory 12 specified by these messages A2, B2.

The contents of the command-type information specified by the 1st word of the message issued by each remote access command—the REMOTE READ command, REMOTE WRITE command and REMOTE SWAP command—are shown in FIG. 19.

Next, let us explain the configuration and action of the receive controller 345 shown in FIG. 16, keeping in mind the facts explained with reference to FIGS. 17 and 18A, B.

The command interpretation unit 3451 receives a message, and judges the message data storage destination referring to the AS (Destination) information for the 1st word of the received message. If the value of the AS (Destination) information is "00", that is, a "Logical Memory" specification, then the parameters such as the data storage address, number of transfer data, etc. specified in the received message are set in the DMA controller 3452; the DMA controller 3452 transfers the received message data to the corresponding area on the memory 12 of the destination PE through the bus interface 341.

If the received message AS (Destination) information value is "10", that is, a "Ring Buffer" specification, the command interpretation unit 3451 requests that the data be transferred to the ring buffer management unit 3453.

If the received message AS (Destination) information value is "11", that is, a "CPU" specification, the command interpretation unit 3451 requests to the bus interface 341 that the data be transferred to the processor.

The ring buffer management unit 3453 has a write pointer 34531 in which the storage address of the next datum in the ring buffer area 4120B on the memory 12 is set; the received message data are transferred continuously to the ring buffer area 4120B while the write-in pointer 34531 value is updated by the sequencer 34532. The ring buffer management unit 3453 also has a read-out pointer 34533 and a comparator 34534.

The address of the next datum to be read out from the ring buffer area 4120B is set in the read-out pointer 34533. This read-out pointer 34533 is updated by the processor 310. The comparator 34534 compares the values of the 2 pointers 34531 and 34532. If both pointers specify addresses that are adjacent to the ring buffer area 4120B, a buffer full signal that indicates that the ring buffer area 4120B is full is set to ACTIVE and output to the bus interface 341. The bus interface 341 outputs the buffer full signal that has been set to ACTIVE to the processor 310, through the bus 130, as an interrupt signal.

The ring buffer management unit 3453 acts coupled to the command interpretation unit 3451 and the bus interface 341; since the circuit can be of a small scale, the amount of hardware in the whole receive controller 345 need only be increased by a small amount.

One example of a program that is executed for the processor 310 to issue communication commands other than remote access commands to the PE300 is given below.

The example given below schematically shows a program that issues the PUT command mentioned above.

putaddr is the address assigned to the PUT command on the command entry area.

put(destination PE, source address, size, destination address, miscellaneous parameter 1, miscellaneous parameter 2, . . . )

{
Write <destination PE> into putaddr.
Write <size> into putaddr.
Write <destination addr> into putaddr.
Write <source address> into putaddr.
Write <miscellaneous parameter 1> into putaddr.
Write <miscellaneous parameter 2> into putaddr.
}

It is also possible to specify the local PE300 as the destination PE.

Figure 20:
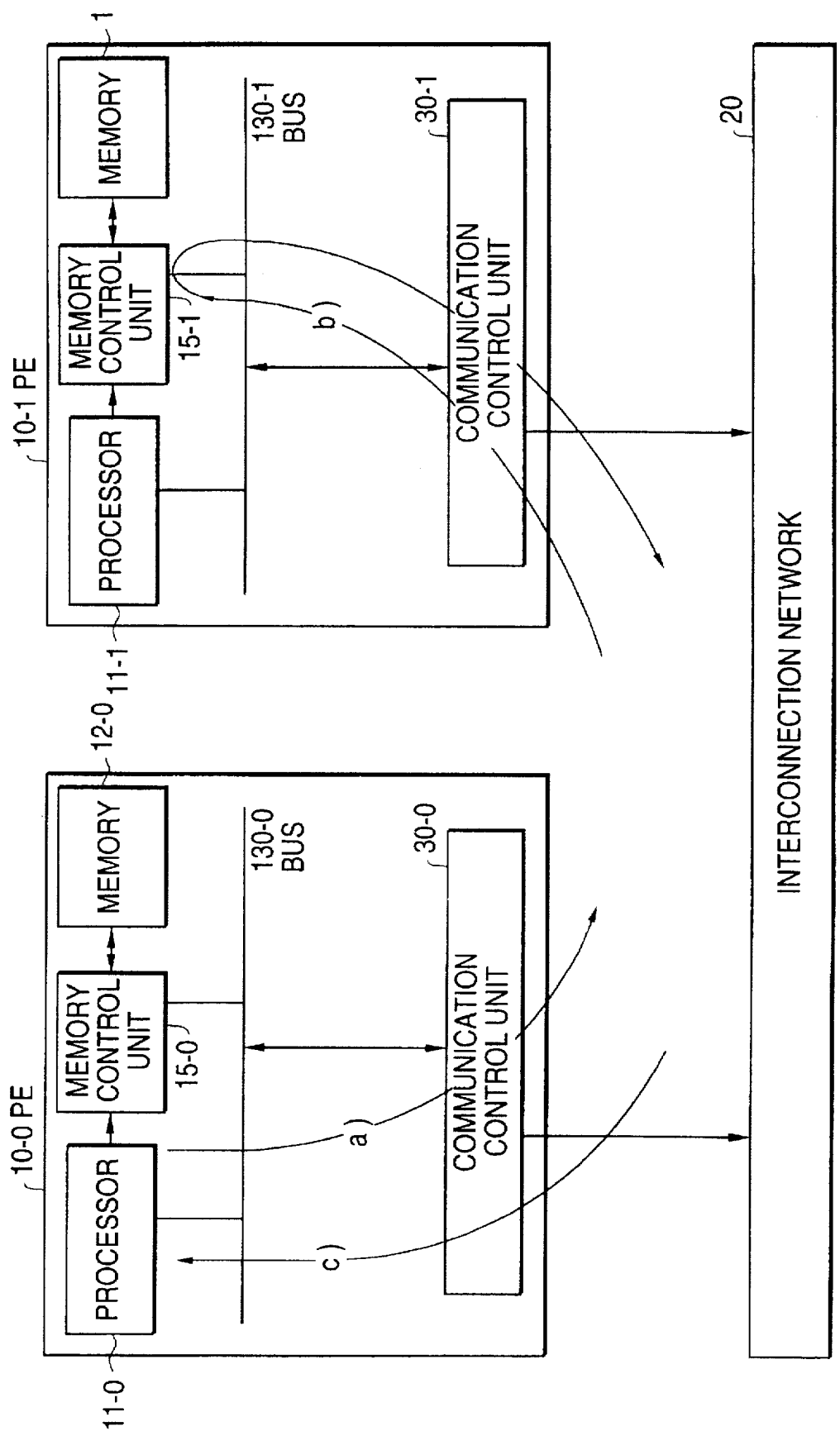
FIG. 20 is a configuration diagram to explain a remote read operation.

FIG. 20 explains an outline of the REMOTE READ command execution procedure.

The processor 11-0 of PE10-0 issues a REMOTE READ command to the bus 130-0 inside the local PE10-0; then a send message is transferred to the communication control unit 30-1 of the PE10-1 in which the data to be read are present via the communication control unit 30-0, as shown by route a).

At this time the processor 11-0 monopolizes the bus 130-0 inside the PE10-0; and the system goes into waiting for a response message to the REMOTE READ command.

The communication control unit 30-1 of the PE10-1 that received the send message, reads out the memory content at the specified address and returns the result to the send source PE10-0 as the send message, as shown by route b).

When the send source PE10-0 receives the message which the PE10-1 sent as the send message as the response message, it posts the result to the processor 11-0 as the processor 11-0 REMOTE READ command read-out result, as shown by route c).

As explained above, in the execution of a REMOTE READ command it is possible for a deadlock to occur. That is to say, in the access control system of this invention, it is not necessary for interrupt processing to be performed constantly in order to respond to the remote read request from the remote PE, even if the processor monopolizes the bus. However, when, for example, there is a concentration of processing for the response, interrupt processing to the processor becomes necessary. While the processor is monopolizing the bus, the interrupt processing cannot be received, so it is possible for a deadlock to occur.

The configuration that averts the deadlock is described below.

Figure 21:
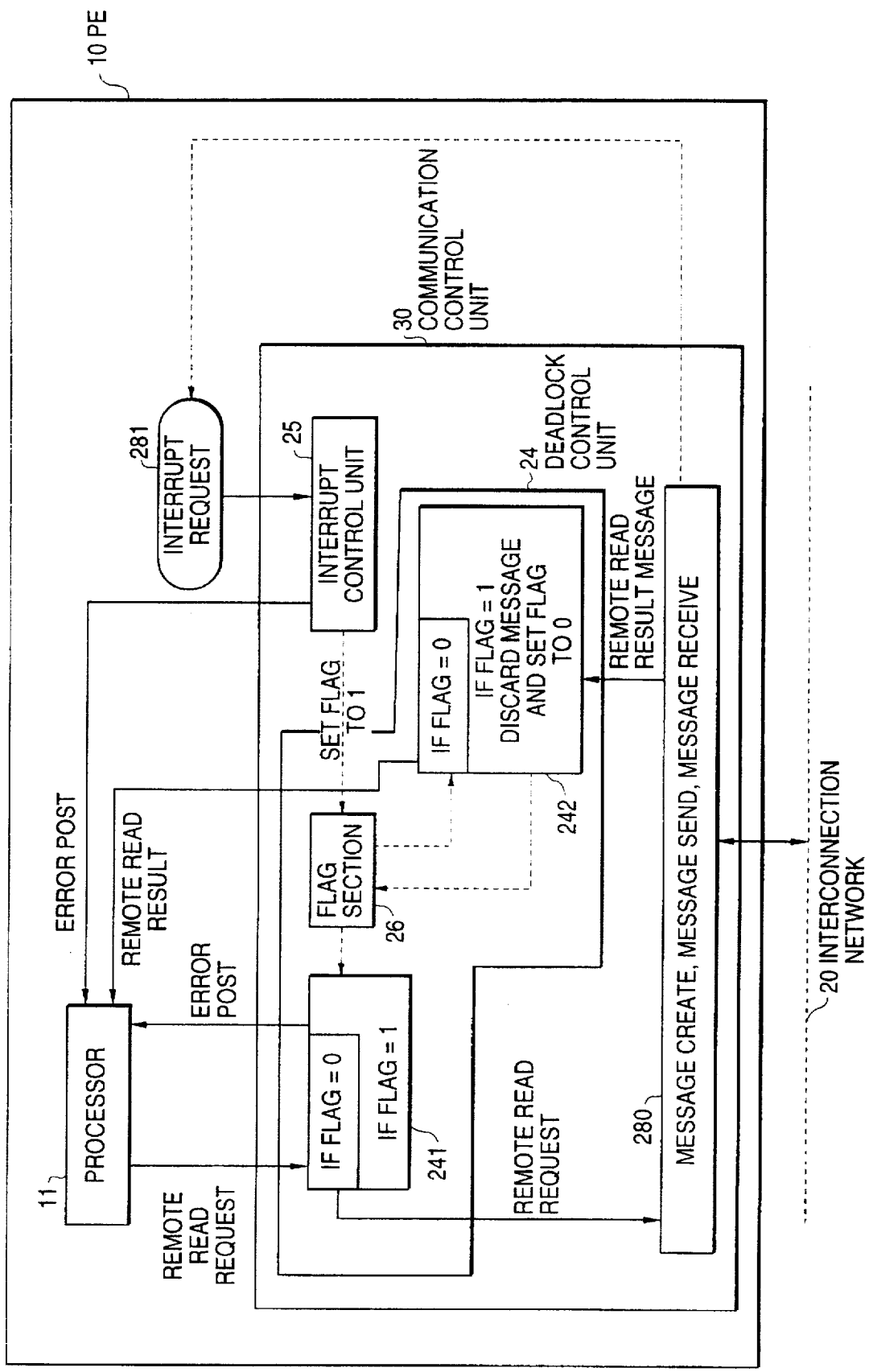
FIG. 21 is a diagram that shows the configuration and action of the deadlock control unit of this invention.

FIG. 21 is a diagram that shows the configuration and the action of the deadlock control unit of this invention.

The deadlock control unit 24 consists of the flag section 26 and the flag judgment sections 241 and 242. Here, it is not necessary for the flag judgment section to be split into 2 sections, but for convenience in explanation we will use 2 sections. The message creation, message send and message receive functions that were discussed above are shown being performed by a single block numbered 280. Other constituent elements are omitted for convenience.

The deadlock control unit 24 constantly monitors addresses and commands which the processor 11 outputs to the bus. When flag judgment section 241 of the deadlock control unit 24 detects that a REMOTE READ command has been issued from the processor 11, if the flag in the flag section 26 is "0", the REMOTE READ command is sent to the interconnection network 20. If the flag judgment section 241 detects the flag in the flag section 26 to be "1", the fact that the REMOTE READ command has ended in error is posted. If a signal that indicates that an interrupt request 281 has been generated in response to a REMOTE READ request from a remote PE10 is sent out by the interrupt control unit 25, the flag in the flag section 26 inside the deadlock control unit 24 is set to "1" by the interrupt control unit 25. If a message resulting from the remote read is received, then, if the flag judgment section 242 judges that the flag in the flag section 26 is "0", the remote read result is transferred to the processor 11; if the flag in the flag section 26 is judged to be "1", the received message is discarded and the flag is set to "0". If the flag is "1", it means that an interrupt request occurred after the REMOTE READ command was issued, and that the fact that the REMOTE READ command ended in an error has already been posted to the processor 11. Consequently, since the response message to this REMOTE READ command is the message of a command that has caused an error, it is discarded. Then the flag is reset to "0" and a REMOTE READ command is issued again. At this time, if the flag has changed to "1" as the result of a response to an interrupt request by the interrupt control unit 25, the fact that this repeat remote read request has again ended in an error is posted to the processor 11.

Figure 22A:
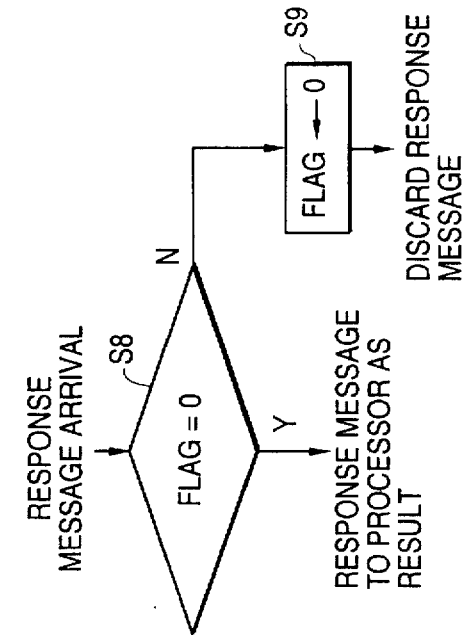
FIGS. 22A, 22B and 22C are flow charts explaining the action of the deadlock control unit shown in FIG. 21.

Let us now explain the action of the deadlock control unit in FIG. 21, using the flow charts in FIGS. 22A, B and C.

First, FIG. 22A shows the flow in the deadlock control unit 24. When the PE10-0 issues a REMOTE READ command, whether the flag is "0" or not is judged (step S1); when the flag is "0", a remote read message is sent from the communication control unit 30 (step S2). If a remote read message has been sent, the deadlock control unit 24 judges whether or not the response message has arrived (step S3).

If the response message has arrived in step S3, the completion of the remote read is posted to the processor.

If the response message has not arrived in step S3, it is judged whether or not an interrupt request exists (step S4). If an interrupt request does not exist, then the process returns to step S3 and the system continues to wait for the arrival of the response message.

If there is an interrupt request in step S4 the flag is set to "1" (step S5), and, at the same time, the processor 11 is informed that an error has occurred, and the exception handler starts operation.

Figure 22C:
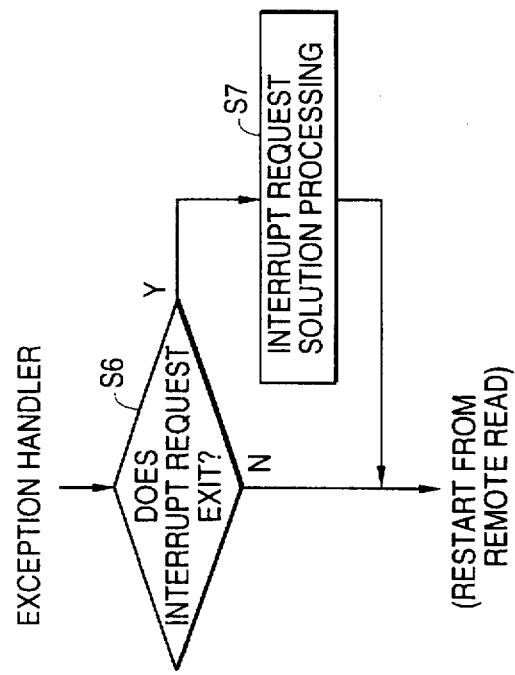

FIG. 22C is a flow chart of the exception handler.

In the exception handler, when there is an interrupt request (step S6) solution processing for the interrupt request is performed (step S7). If there is no interrupt request, or if there is an interrupt request but the solution processing for the interrupt request has ended, the remote read is restarted. Even when the flag in step S1 in FIG. 22A is not "0", this exception handler is started and performs processing to solve the interrupt request.

Figure 22B:
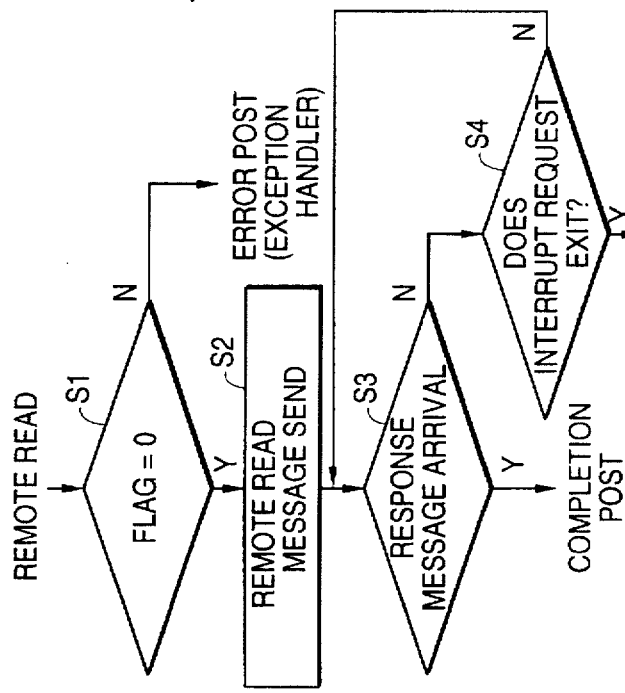

FIG. 22B is a flow chart of the bus interface hardware action.

In step S3, the bus interface starts to monitor whether or not a response message has arrived. When a response message has arrived, if the flag is "0" (step S8) it means that there has not been an interrupt request, so a response message is posted to the processor as a result and a new command is issued from the processor 11. However, when a response message has arrived and the flag is not "0", the flag is returned to "0" (step S9) and the response message is discarded. As stated above, this is because when the flag is "1" an error is posted to the processor and the REMOTE READ command ends in an error, so the response message to this REMOTE READ command that caused the error is discarded.

Thus, when an interrupt request occurs, the reason that the flag is set to "1" and the processor is informed that the remote read has ended in an error, is so that the processor can respond quickly to the interrupt request and perform the interrupt processing.

Figure 23:
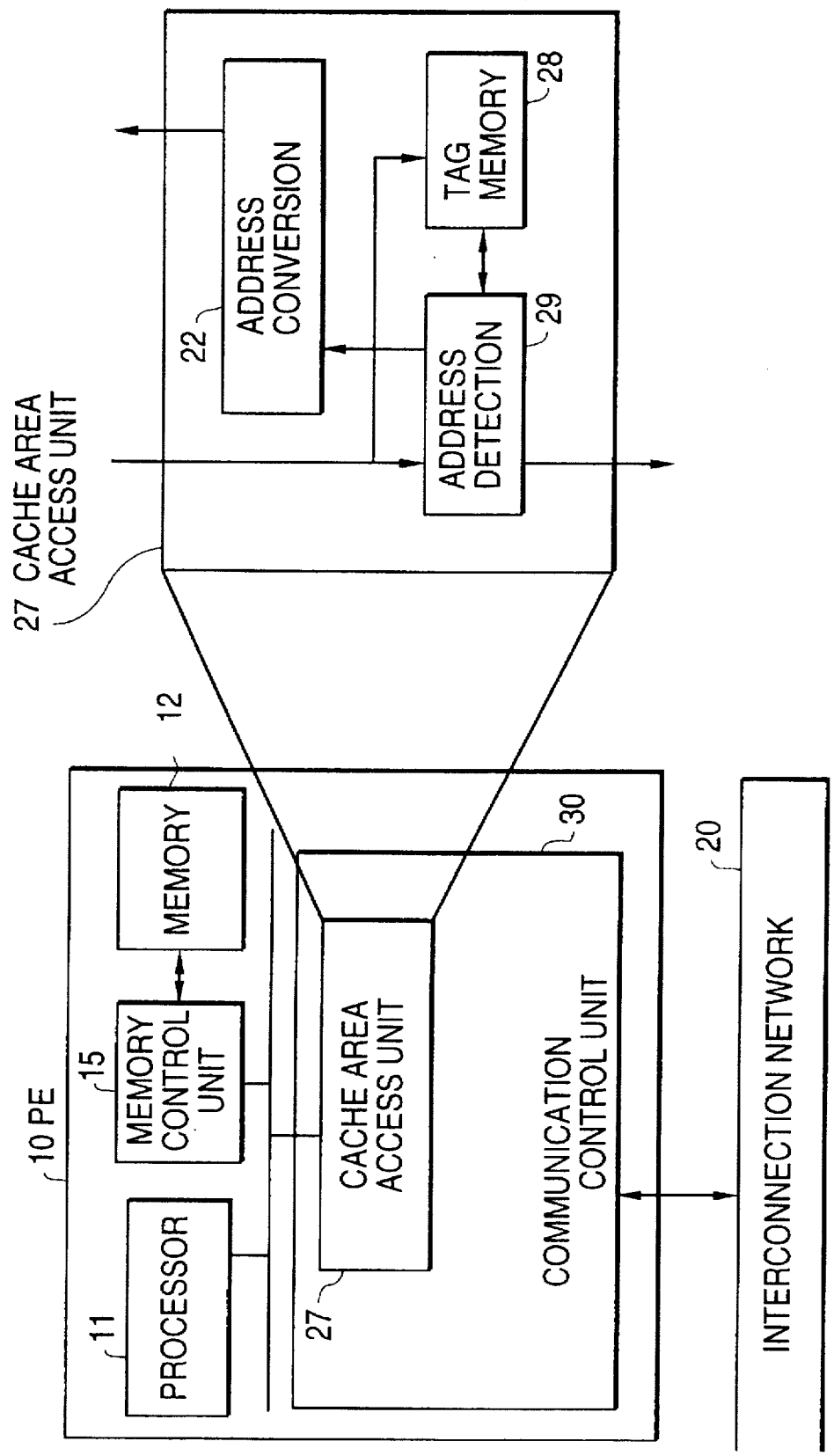
FIG. 23 is a configuration diagram of the important parts for cache area access control.

FIG. 23 is a configuration diagram of the parts that are important for cache area access control.

When remote access is performed, the processor 11 controls the cache area access unit 27 and, at the same time, the cache area access unit 27 controls access to the memory 12 through the memory control unit 15. The address signal output by the processor is input to the cache area access unit 27.

The cache area access unit 27 has an address detection section 29 that detects addresses from the processor 11. An address detected by the address detection section 29 is transferred to the tag memory 28 and compared with the address stored in the tag memory 28; if there is a HIT (agreement is detected), access to the cache area 21 set aside in the memory 12 by the address converted by the address conversion section 22, is accessed. If, as a result of comparison of the address detected by the address detection section 29 with the address stored in the tag memory 28, a MISS occurs at the time of a read, or, at the time of a write, if either a HIT or MISS occurs, then the remote PE is accessed.

Now let us explain the action of the units that control the cache area, shown in FIG. 23, more specifically.

First, in the case of a remote write, the message of the REMOTE WRITE command to be issued by the processor 11 is created by the communication control unit 30; the communication control unit 30 of the PE that receives the message interprets it and makes the remote write happen by storing the message in memory.

Within the cache area access unit 27, the address detection section 29 that detects the remote access address and the tag memory 28 detect whether or not a copy of the datum corresponding to that address exists in the cache area of the local memory (the memory of the local PE). In addition, the processor 11 reads out and updates the content of the tag memory 28 that records the existence of such a copy, for the purpose of detecting the existence of the copy in the cache area of the memory 12. When a remote read is performed, when the address detection section 29 detects the existence of a copy of the datum corresponding to that address in the cache area of the memory 12, then the address conversion section 22, which converts the remote read address to the address of the copy which exists in the cache area of the corresponding memory 12, is used to read that copy out, and the result is returned to the processor in place of performing the remote access.

When a remote read is performed, when the address detection section 29 detects that a copy of the datum corresponding to that address does not exist in the cache area of the memory 12, then the processor is requested to perform exception processing. In that exception processing, the datum in the memory 12 of the remote PE is transferred to the memory address that should be created by the address conversion section 22 through the interconnection network 20, and the tag memory 28 is updated to show that the copy exists.

When a remote write is performed, when the address detection section 29 detects that a copy of the content of that address exists in the cache area of the memory 12, then the address conversion section 22, which converts the remote write address to the address of the copy that exists in the cache area of the corresponding memory 12, is used to write the datum in to the address at which that copy exists, and, at the same time, the communication control unit 30 is requested to issue the remote write.

In addition, when a remote write is performed, when the address detection section 29 detects that there is no copy of the datum corresponding to that address in the cache area of the memory 12, the communication control unit 30 is requested to issue a remote write.

Figure 24:
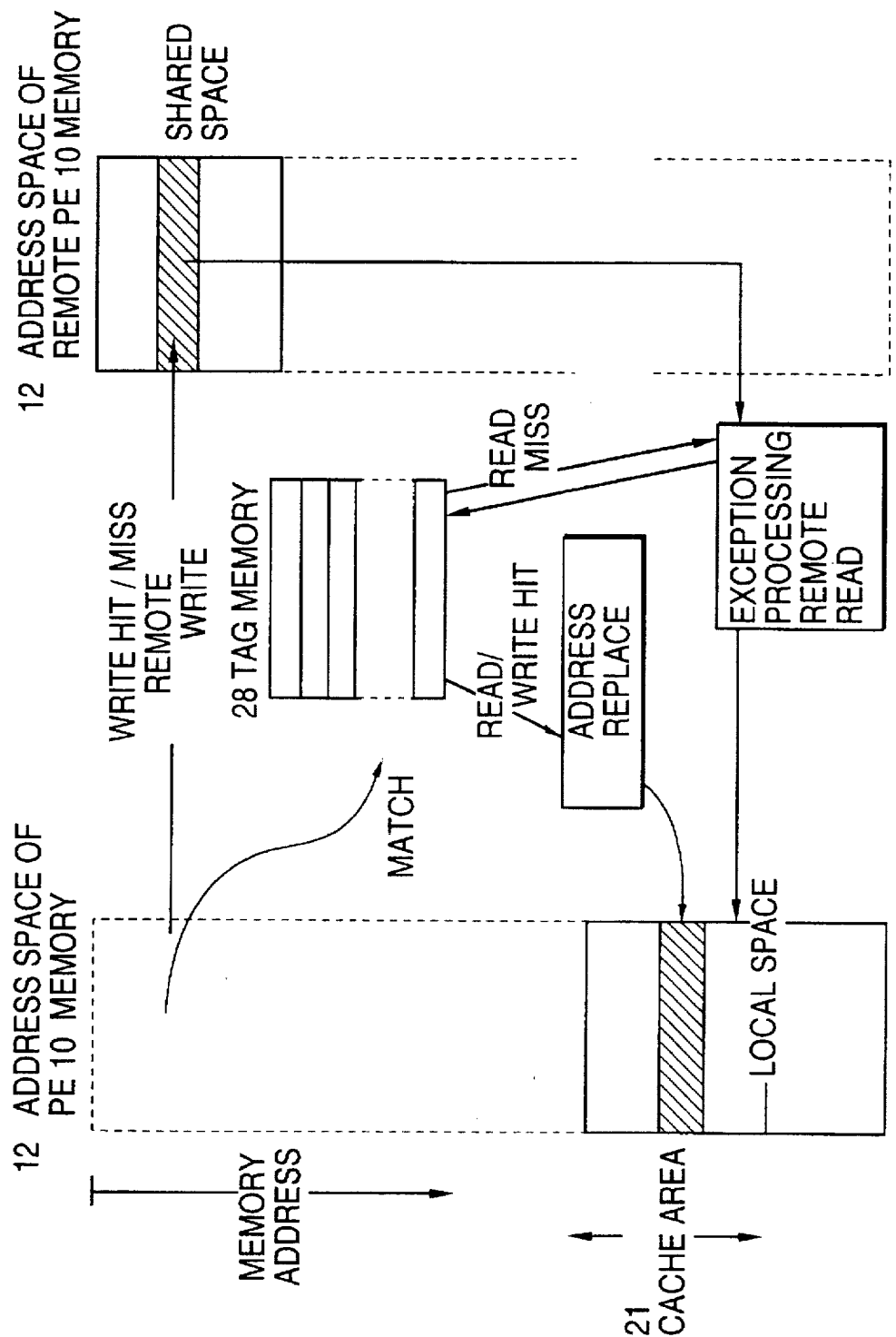
FIG. 24 is a diagram explaining the write-through action according to the cache area access control of this invention.

FIG. 24 shows the relationship between the cache area 21 set aside in the memory 12 of the local PE10, and the memory 12 of the remote PE10, in the write-through action by the cache area access control of this invention.

When a remote read is executed, first, in the local PE10, the tag in the tag memory 28 of the local PE10 is compared to the address sent from the remote PE10. When the read results in a HIT (the addresses agree), a read is performed from the cache area 21 of the memory 12 of the local PE10; when the read results in a MISS, exception processing is executed, the content of the corresponding address is transferred from the remote PE10, and the corresponding address is stored in the tag memory, and, at the same time, the content of the address is stored in the cache memory 21.

In the case of a remote write, if the write request results in a HIT, it means that the address that corresponds to that address exists in the cache area 21 of the memory 12 of the remote PE10, so the write is performed for that cache area 21. Then the remote write is performed for the distributed shared memory space in the memory 12 of the remote PE10 in accordance with the write through action. When the write results in a MISS, the write is performed for the distributed shared memory space of the memory 12 of the remote PE10.

Figure 25:
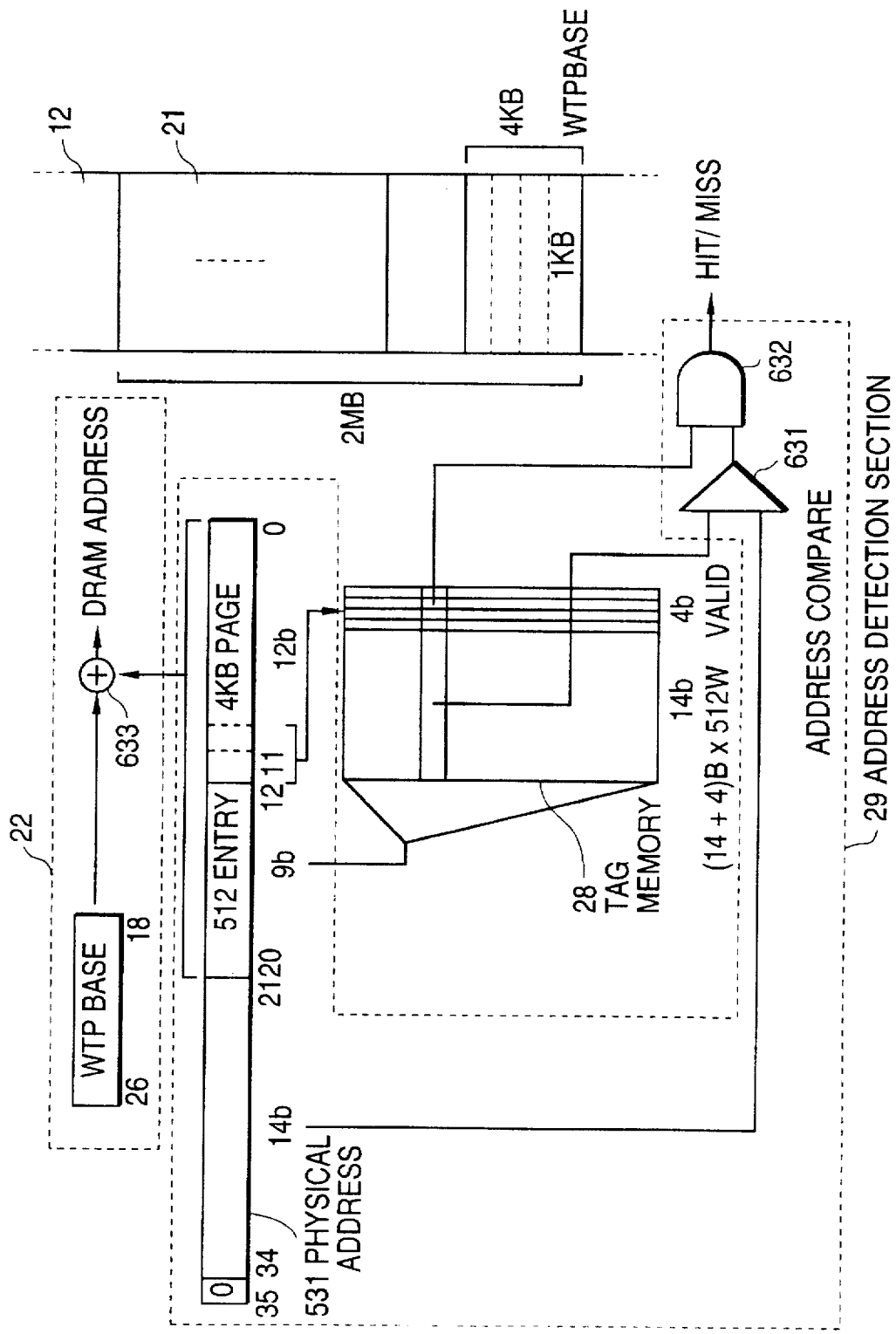
FIG. 25 is a specific configuration diagram of the cache area access unit in FIG. 23.

FIG. 25 shows the cache area access unit 27 in FIG. 23 in more detail.

Assuming that the processor address space has 36 bits (64 Gbytes), half of that space, 35 bits (32 Gbytes), acts as the distributed shared memory space. If there are 1,024 PEs in the parallel computer system, the upper 10 bits of these 35 bits express the rcid (or the PE number); the remaining 25 bits (32 Mbytes) become the addresses for the distributed shared memories of the respective PEs.

The area that is for the purpose of holding a copy of the remote memory (memory in the remote PE), in other words the cache area, is 2 Mbytes; it has addresses such that it will not overlap the area used as the distributed shared memory, or the command entry area, in the local memory. The first address for this purpose is set in WTPBASE. That 2 Mbyte area is divided into 2,048 1 Kbyte areas; these areas hold copies of the contents of the remote memory within the 1 Kbyte limits.

Bits 0 to 11 of the physical address (address signal) indicate 1 page of data, that is 4 Kbytes of data; the 512 entries in the 9 bits from bit 12 to bit 20 give the address of the tag memory 28; bits 21 to 34 give the rcid and the address that includes the address of the memory in that PE; bit 35 indicates the local memory area or the distributed shared memory area.

The tag memory 28 is a 512-word RAM; each word consists of a 14-bit upper address section and a 4-bit subline.

Let us now explain the way in which the write request scores a HIT by the write-through page system, using FIG. 25. The address detection section 29 consists of a comparator 631 and an AND circuit 632. First, a 36-bit physical address 531 is input from the processor 11 to the address detection section 29, then it is compared with the content of the address fetched from the tag memory 28 as the address consisting of the upper 14-bit address and the next lower 9 bits in the 35-bit distributed shared memory address, by the comparator 631. Then the decoded values of bit 10 and bit 11 are compared with the values of the 4 sub lines in the tag memory 28. In other words, the upper 14 bits of the 35-bit distributed shared memory space are compared to the upper address section of the tag memory word having the next lower 9 bits in the distributed shared memory space as its address in the comparator 631. If the values agree and in addition the subline bit corresponding to the area consisting of 4 Kbytes divided into 4 parts is "1", the output of the AND circuit 632 becomes "1" and that access is taken to be a HIT (the copy exists in the cache area 21 of the memory 12). If the addresses do not agree or do agree but the subline bit is not "1", that access is taken to be a MISS (the copy does not exist in the cache area 21 of the memory 12).

Whether a cache HIT or MISS has occurred is judged according to the HIT/MISS signal output from the AND circuit 632; and it is decided whether or not to access the cache area 21 of the memory 12.

When a HIT occurs, one address, either the 12 bits that indicate a page consisting of 4 KB or the 9 bits that indicate 512 entries, is added to the 9-bit WTPBASE address set in the cache area access unit 27 by the adder 633 in the address conversion section 22; the resulting sum address specifies one address in 1 KB address among the 1 page of memory (4 KB). This makes it possible to access the cache area 21 in the memory 12 using the memory control unit 15.

If, after the write-in to the cache area 21 of the memory 12, the remote write address again points to the distributed shared memory space in the local PE, then the shared memory space in the memory 12 of the local PE is accessed. Of course, when a distributed shared memory space exists in the remote PE, then data are written in to the address area corresponding to the remote PE after the write-in to the cache area in the memory of the local PE.

Details of combinations of the read/write and HIT/MISS actions described above are given in the following table.

| Reead/prefetch | Write |
| --- | --- |
| HIT | |
| The lower 21 bits of the accessed address are regarded as offset from the area for the purpose of caching; WTPBASE is then added to obtain the memory address, the datum is read out and the result of the read is returned to the processor. | A remote write is performed at that address; in addition, the lower 21 bits of that address are regarded as offset from the area for the purpose of caching, the WPTBASE is added to obtain, the memory address and the write is performed. |
| MISS | |
| An access exception is generated, and the processor is requested to perform exception processing. The processor transfers the data in a 1 Kbyte area including that address from the corresponding remote PE to the local memory. The address in the local memory is the lower 21 bits of the accessed address plus WTPBASE. The address is set in the corresponding word of the tag memory, and the subline bit is set to 1. The exception processing is ended, and the access is executed again. | A remote write is performed at that address. |

Summarizing the action, in the case of a write, if the copy exists, the copy is updated and the remote write is performed; if the copy does not exist, only the remote write is performed (write through action). In the case of a read/prefetch, if the copy exists, the datum is read out from that copy; if the copy does not exist, the datum is transferred by exception processing by the processor and then a copy is created in memory.

In this configuration, compared to a distributed shared memory in which only straightforward remote read and remote write are performed, reads in the cache memory after a copy has once been created are not remote reads but only require reading within the local memory, so the data processing speed is at least an order of magnitude faster. That is to say, a datum can be accessed most rapidly when it exists in an external cache memory of the local PE, but the capacity of a local cache memory cannot be made very large, so, although the frequency of remote reads and remote writes becomes high in a parallel computer system in which many PEs are linked, in the present configuration the cache memory is set up within the memory of the local PE, so the cache memory can be made to be large, reducing the frequency of remote read and remote write operations, and increasing the speed of the system as a whole by at least an order of magnitude.

However, in this method, in writing in to an area in which a copy has once been made, only writing in to the local PE will be reflected. That is to say, assuming that the contents of a certain memory area have been rewritten, if the remote PE has a copy of that area, the result of rewriting that area will not be reflected in that copy. It is assumed that the fact that it is not reflected will tend to be regarded as the responsibility of the programmer. At the time of a certain execution, it is sufficient to show that the word has been cleared and the copy discarded. Many applications of parallel programs increase the efficiency of the conversion to parallel processing by appropriately selecting the time at which the write-in is reflected in the copy; in the present method, in which this kind of program structure is to be expected, it is possible to operate the distributed shared memory system efficiently without unnecessary remote memory reads or complicated cache memory consistency control.

In the above configuration example we have explained the write-through page, but even in the case of a write-back, the establishment of a cache area in the memory can increase the probability of a cache HIT.

According to this invention as explained above, the processor can issue a command by writing the parameters (command data string) of the command to be issued into the command entry area. Consequently, by establishing an address area for issuing of user level commands in the command entry area, it becomes possible to issue commands at the user level without transferring to the system level.

Also, by establishing a deadlock control unit, it has become possible to avoid the deadlock that can occur when a REMOTE READ command is issued.

In addition, by establishing a cache area in part of the memory, it becomes unnecessary to have an external cache memory and the hardware to control it, making it possible to simplify the configuration. What is more, the capacity of the cache area can be made large, so the probability of a cache HIT can be made large. This makes it possible to reduce the frequency of access to remote PEs, increasing the operation speed of the parallel computer.

What is claimed is:

1. An inter-processor-element access control system in a parallel computer system including a plurality of processor elements connecting through an interconnection network, each processor element in said plurality of processor elements comprising:
   a processor;
   a local memory including a command entry area;
   bus interface means for detecting a write of a command data string, including an address corresponding to a type of command, to said command entry area by said processor in said processor element, for generating a command from the command data string, and for controlling a read/write of data in said local memory;

send controller means for interpreting the command generated by said bus interface means and generating a send message;

interconnection network interface means for transmitting the send message generated by said send controller means to the interconnection network and for receiving a message addressed to said processor element from the interconnection network; and receive controller means for interpreting the message received by said interconnection network interface means and storing data transferred in the message in an area specified in said local memory of said processor element through said bus interface means.

2. The access control system according to claim 1, wherein a buffer area is specified as a storage destination of data in a received message command for temporarily accumulating data in said local memory, said receive controller means storing the received message data in the buffer area through said bus interface means.

3. The access control system according to claim 1, wherein:

when a transfer command is received requesting that contents of said local memory be transferred to another processor element, said receive controller means transmits the command to said send controller means, and when said send controller means receives the transfer command, said send controller means reads out data requested by the transfer command from said local memory through said bus interface means, and constructs a message to send the data.

4. The access control system according to claim 1, each of said plurality of processor elements further comprising a command queue into which commands created by said bus interface means are written.

5. The access control system according to claim 3, wherein said bus interface means comprises a mechanism for generating a remote access command to have the processor access a memory of another processor element when it is detected that the processor has accessed to a specified address area.

6. The access control system according to claim 5, each of said plurality of processor elements further comprising a remote access send queue into which commands for the remote access created by said bus interface means are written.

7. The access control system according to claim 1, wherein when said processor is running at system level, said bus interface means creates a system mode communication command from the command data string written into the command entry area, and, when said processor is running at user level, said bus interface means creates a user mode communication command from the command data string written into the command entry area.

8. The access control system according to claim 7, each of said plurality of processor elements further comprising:

a system send queue into which the system mode communication commands created by said bus interface means are written; and a user send queue into which the user mode communication commands are written; and wherein said send controller means fetches communication commands from the system send queue or user send queue and executes the communication commands.

9. The access control system according to claim 1, each processor element of said plurality of processor elements further comprising transfer means for transferring command messages, constructed by said send controller and completed by processing within said processor element, to said receive controller means without going through said interconnection network interface means.

10. The access control system according to claim 9, each of said plurality of processor elements further comprising:

a response queue into which a response command to a message set by a communication command that requests transfer of data stored in a storage area of the memory of the local processor element, is written by said receive controller means, said receive controller means receiving the message through said transfer means, and wherein said receive controller means fetches the communication commands from said response queue and executes the communication commands through said bus interface means.

11. The access control system according to claim 1, each of said plurality of processor elements further comprising:

a remote access response queue into which response commands to messages set by commands for remote access that request reference to contents of memory in a local processor element issued from a remote processor element are written by said receive controller means, said receive controller means receiving the messages through said interconnection network interface means; and wherein said receive controller means fetches the commands for remote access from said remote access response queue, and reads out the contents of the memory of the local processor element requested by the command for remote access, and constructs messages directed to the remote processor element.

12. The access control system according to claim 1, wherein said bus interface means determines a type of command according to the address of the command data string which the processor writes into the command entry area.

13. The access control system according to claim 12, each of said plurality of processor elements further comprising: memory protection means for limiting an area within the command entry area into which the command data strings can be written when the processor is running at user level.

14. The access control system according to claim 12, wherein said bus interface means further comprises detection means for detecting an end of the command data string by counting a number of command data written into the command entry area for each type of command determined in accordance with the address of the command entry area into which the processor has written a command data string.

15. The access control system according to claim 14, wherein said bus interface means further comprises checking means for checking an appropriateness of a part of the command data string, based on the number of the command data counted by said detection means.

16. An inter-processor-element access control system including a plurality of processor elements connected through an interconnection network, each of the plurality of processor elements comprising:

a local memory having a cache area;

memory control means for controlling said local memory and for accessing said cache area provided in said local memory in a same manner as access to an area of said local memory other than the cache area; and cache area access means for controlling the access to said cache area by said memory control means.

17. The access control system according to claim 16, wherein said cache area access means comprises, a tag memory for storing identifiers that identify each of said plurality of processor elements and a tag comprising a part of a data address stored in the cache area, and address detection means for comparing a tag that is a part of an address output from the processor with a tag stored in said tag memory, and determining whether or not data to which the processor requests access exists in the cache area, and address conversion means for converting the address output from the processor to an address for the purpose of access to the cache area.

18. The access control system according to claim 17, wherein said address conversion means adds the address corresponding to the cache area output from the processor to a specified address set inside said cache area access means, and creates an address of the cache area on the memory.

19. The access control system according to claim 16, wherein said cache area access means comprises, means for detecting a fact that a copy of a content of a remote write destination address does not exist in memory, when a remote write, is performed, and wherein when a copy of the content of the remote write destination address does not exist in memory, said processor issues a remote write.

20. An inter-processor-element access control system for controlling a plurality of processor elements through an interconnection network, each of the plurality of processor elements comprising:

a processor;

a memory;

memory access means for controlling access to said memory;

means for performing a remote write by generating a remote write command message after setting high order bits of an address field of a write instruction issued by said processor as a destination processor identifier and setting remaining lower bits as a memory address of a corresponding processor element, by interpreting the command through the processor element receiving the message, and by storing data of the message in said memory;

means for performing a remote read by generating a remote read command message after setting high order bits of an address field of a read instruction issued by said processor as a destination processor identifier and setting remaining lower bits as a memory address of a corresponding processor element, by interpreting the command through the processor element which has received the message, and by reading memory data and returning a resultant message to the processor of the processor element which issued the command; and cache area access means, coupled to said memory access means, for detecting that a cache area in said memory stores a copy of data corresponding to a remote access address when said means for performing a remote write or said means for performing a remote read gains remote access.

21. The access control system according to claim 20, wherein said cache area access means comprises tag memory for storing the copy of data to detect that the copy of data at the remote access address is stored in the cache area of said memory and said cache area access means accesses the cache area in a same way as an area in the memory other than the cache area is accessed by said memory access means.

22. The access control system according to claim 20, wherein said cache area access means comprises:

means for detecting that, when the remote read is performed, the copy of the data at a remote read address is stored in the cache area of the memory; and means for converting the remote read address into a corresponding address of the copy stored in the cache area of the memory so as to read the copy and returning a result to the processor instead of gaining the remote access.

23. The access control system according to claim 20, wherein said cache area access means comprises a tag memory that stores information indicating that a copy of data corresponding to the address of the remote access destination exists in the cache area.

24. The access control system according to claim 23, wherein said cache area access means further comprises, address detection means for detecting a fact that a copy of a data corresponding to a remote read destination address exists in the cache area of the memory when a remote read, is performed, and address conversion means for converting the address of the copy that exists in the cache area of the memory corresponding to a remote read destination address; and wherein said cache area access means reads this copy out and returns a result to the processor in place of performing remote access.

25. The access control system according to claim 24, wherein said tag memory is updated when data is transferred from a remote processor element to said memory, based on a fact that said address detection means detected that a copy of the data corresponding to the remote read address does not exist in the cache area of the memory.

26. The access control system according to claim 20, wherein said cache area access means comprises:

means for detecting that a copy of contents at an address of the remote read is not stored in the cache area of the memory; and tag memory updated when remote processor element data is transferred to the cache area of the memory through the network.

27. The access control system according to claim 20, wherein said cache area access means comprises, means for detecting that, when the processor prefetches contents of the memory of a remote processor element by means of a prefetch function, a copy of a content of a prefetch destination address exists in the cache area of the memory in a local processor element, and means for converting the prefetch destination address into an address of a corresponding copy that exists in the cache area of the memory; and wherein said cache area access means reads that copy out and returns a result to the processor.

28. The access control system according to claim 20, wherein said cache memory access means comprises, means for detecting a fact that a copy of a content at an address at which prefetching is done does not exist in a memory of a local processor element when the processor prefetches the content of memory of a remote processor element by means of the prefetch function, and a tag memory that, when a copy of the content of the address of the prefetch destination does not exist in the memory of the local processor element, is updated as the data in the memory of the remote processor element are transferred to the cache area through the interconnection network.

29. The access control system according to claim 20, wherein said cache area access means comprises, means for detecting a fact that a copy of a content of a remote write destination address exists in memory when a remote write, is performed, and means for converting the remote write destination address to an address of a corresponding copy that exists in the cache area of the memory; and wherein said cache area access means writes data into the address at which that copy exists, and, at the same time, issues a remote write command.

30. The access control system according to claim 20, wherein the copy of the contents at the remote access address is stored in the cache area of the memory in a writing back operation.

31. An inter-processor-element access control system in which processor elements are connected through a network, each processor element comprising:

a processor;

a memory;

message transmitting means for transmitting a remote read request to another processor element;

interruption request means for sending an interruption request to said processor; and deadlock control means for determining the remote read request to be erroneous and controlling said processor to receive an interruption by said interruption request means when said processor transfers the remote read request to another processor and said interruption request means sends the interruption request to said processor before data is returned from the other processor in response to the remote read request, with a priority on a waiting state for the data as a response of the remote read request.

32. An inter-processor-element access control system in which processor elements are connected through an interconnection network, each processor comprising:

a processor;

a memory;

remote read means for determining an identifier of a destination processor element storing read object data and for determining an address within a memory of said destination processor according to an address field in a read instruction issued by said processor of said processor element, for sending a remote read command message, and for informing said processor of a read result of the read instruction from said processor when the destination processor element reads contents of the memory at a specified address and returns a result as a return message to said processor element and when said processor element receives the return message; and deadlock control means for monitoring whether an interruption request signal has been issued to said processor when a remote read request is issued and said processor element is waiting for the return message from the destination processor element, and for notifying said processor that a remote read has been completed by determining a result of a received return message as indicating a normal termination when no interruption request is issued until the return message arrives, for notifying said processor that access fails when the interruption request is issued in a monitoring process, and for discarding the return message corresponding to the remote read request when said processor is notified of a failure of access.

33. The access control system according to claim 32, wherein said deadlock control means monitors the interruption request signal when the remote read request is issued and the source processor element is waiting for the return message from the destination processor element, and notifies the processor that access fails when the interruption request is issued in a monitoring process.

34. The access control system according to claim 33 further comprising:

flag means for setting, when the processor is informed that the access fails, a flag indicating that an access error has arisen, and for resetting the flag when the return message then arrives from the destination processor element.

35. The access control system according to claim 34 further comprising:

means for giving an error notification in response to a remote read request issued again while the flag is being set.

36. The access control system for controlling access among a plurality of processor elements in a parallel computer that are linked through an interconnection network, each of said plurality of processor elements comprising:

a memory having a command entry area in a first memory area and a cache area in a second memory area that is different from said command entry area;

processor means for outputting at least an address of an access destination, and for writing a command data string into the command entry area when the address indicates the command entry area;

bus interface means for monitoring the addresses output by said processor means, for creating a command from the command data string when the address indicates the command entry area, for creating a command for remote access based on the data output by said processor means when the address indicates an area other than the command entry area and the cache area, for accessing the cache area in accordance with a content of the address in a case of the remote access, and for controlling said processor means to process an interrupt request to said processor means with priority on a waiting state for a response message to the remote access when said processor means is on standby waiting for the response message to the remote access;

send controller means for interpreting the command created by said bus interface means, and constructing a send message;

interconnection network interface means for sending send messages constructed by said send controller means to the interconnection network, and receiving messages from the interconnection network; and receive controller means for interpreting messages received by said interconnection network interface means, and storing data transferred by the messages in a specified area in said memory through said bus interface means.

37. An inter-processor-element access control method in a parallel computer system which connects a processor element to a plurality of other processor elements through an interconnection network, comprising:

detecting a write of a command data string to a predetermined command entry area by a processor in the processor element and generating a command from the command data string, an address in the predetermined command entry area corresponding to one type of command issued from the processor;

interpreting a generated command and generating a transmission message;

transmitting a generated transmission message to the interconnection network and receiving a message addressed to the processor element from the interconnection network; and interpreting a received message and storing data transferred in the message in a specified area in a memory of the processor element.

38. A method of avoiding deadlock generated in a parallel computer system in which processor elements, each including a processor and memory, are connected through an interconnection network, comprising:

determining an identifier of an identified processor element storing read object data and an address in the identified processor element according to an address field in a read instruction issued by the processor of a source processor element;

sending a remote read command message;

monitoring whether an interruption request signal has been issued to the processor of the identified processor element;

notifying the processor of the identified processor element that a remote read has been erroneous when an interruption request has been issued before the return message arrived in response to the remote read command message;

discarding the return message upon arrival when the remote read is erroneous;

processing a command causing the interruption request to occur; and sending the remote read message again after completion of said processing of the command.

39. An access control method for a plurality of processor elements in a parallel computer that are linked through an interconnection network, comprising:

providing in one of the processor elements a command entry area in a first memory area and a cache area in a second memory area that is different from command entry area;

outputting by a processor in the one of the processor elements at least an address of an access destination;

writing a command data string into the command entry area when the address indicates the command entry area;

monitoring the address output by the processor;

creating a first command from the command data string when the address indicates the command entry area;

creating a second command for remote access when the address indicates an area other than the command entry area and the cache area;

accessing the cache area in accordance with a content of the address when the remote access is performed;

controlling the processor to process an interrupt request to the processor by priority on a waiting state for a response to the remote access when the processor is waiting for a return message to the remote access;

interpreting a received command and constructing a transmission message;

sending the transmission message to the interconnection network;

receiving messages from the interconnection network;

interpreting the messages received from the interconnection network; and storing data transferred through the messages in a specified area in the memory.

* * * * *